US005648959A

United States Patent [19]
Ilyadis et al.

[11] Patent Number: 5,648,959
[45] Date of Patent: Jul. 15, 1997

[54] INTER-MODULE INTERCONNECT FOR SIMULTANEOUS USE WITH DISTRIBUTED LAN REPEATERS AND STATIONS

[75] Inventors: Nicholas Ilyadis, Pepperell, Mass.; Richard Graham, Derry, N.H.

[73] Assignee: Digital Equipment Corporation, Maynard, Mass.

[21] Appl. No.: 270,072

[22] Filed: Jul. 1, 1994

[51] Int. Cl.$^6$ .................................................. H04L 12/413
[52] U.S. Cl. .......................................................... 370/445
[58] Field of Search ................................ 370/85.2, 85.3, 370/85.1, 85.6, 94.1, 94.2, 60, 61, 85.13, 85.8; 340/895.5, 895.51, 895.05; 375/211, 215

[56] References Cited

U.S. PATENT DOCUMENTS

| | | | |
|---|---|---|---|
| 5,301,303 | 4/1994 | Abraham et al. | 395/500 |
| 5,337,310 | 8/1994 | Selyutin | 370/85.3 |
| 5,339,313 | 8/1994 | Ben-Michael et al. | 370/85.3 |

OTHER PUBLICATIONS

Ethernet/IEEE 802.3 1992 Network Data Book, Advanced Micro Devices, pp. 1-229 to 1-241.

Primary Examiner—Douglas W. Olms
Assistant Examiner—Ajit Patel
Attorney, Agent, or Firm—Kenneth F. Kozik

[57] ABSTRACT

A network hub for interconnection of modular devices, such as Ethernet repeaters, bridges, and routers is provided. Such a network hub efficiently interconnects the modular devices to each other. The inter-module connection is not through standard Ethernet media cabling or interconnections so that the hop count does not exceed one for all external connections, as defined by IEEE 802.3 Repeater Specification. Timing synchronization is provided by a global synchronization mechanism. Collision detection is provided by a series of lines that distribute the collision to all modules connected to the hub. The network hub comprises an inter-module bus having a backplane, the backplane able to connect to a number of modules, a clock, a method for transmitting data received by a first module across the inter-module bus to a second module and transmitting the data to ports of the second module, and a method for synchronizing the data as it is transmitted by the second module to the clock within the hub. With such an arrangement, timing of the data transfers and state exchanges on the inter-module connection are such that all state and timing specifications of the IEEE 802.3 repeater specification are satisfied for all ports on all repeater modules and all stations.

20 Claims, 16 Drawing Sheets

INTERNAL/EXTERNAL CLOCK CONTROL

CLOCK GENERATION/RECEPTION

INTER-MODULE INTERCONNECT FOR SIMULTANEOUS USE WITH DISTRIBUTED LAN REPEATERS AND STATIONS

FIELD OF THE INVENTION

This invention relates to local area networks (LANs), and more particularly to a network hub for the interconnection of a plurality of multiport repeaters and stations.

BACKGROUND OF THE INVENTION

A commonly used design for local area networks is the Ethernet design, particularly as the Ethernet design is set out in the ISO 8802-3 ANSI/IEEE 802.3 standards. The Ethernet design uses the CSMA/CD, or Carrier Sense Multiple Access with Collision Detection methodology to permit multiple stations on the LAN to share access to the media.

Implementations of the Ethernet design typically use a repeater to interconnect media segments. The repeater is a well defined concept; particularly, the IEEE Standard, IEEE 802.3 Section 9.1 to 9.8, sets out a standard design of a repeater employing the CSMA/CD collision detection method.

In one embodiment, a repeater is connected in a star configuration with one station connected to each port of the repeater. In this embodiment there may be as many stations connected to the repeater as there are ports on the repeater.

In an alternative embodiment, a port of the repeater may be connected to a plurality of stations by a shared transmission medium. In this embodiment, each port of the repeater may have a plurality of stations connected thereto, and so the repeater may have many more stations connected to it as there are ports on the repeater.

In either case, each repeater connection represents a LAN segment. LAN segments that are tied together via a repeater experience the same LAN traffic and collision detection and are said to be in the same "collision domain".

In some repeater designs:, there is a provision for a first repeater to be connected to a second repeater. Such a connection is necessary to provide for large networks of stations, particularly where it is desired to join together more stations than one repeater has provision for handling. Such repeater interconnections allow the extension of the collision domain.

An inter-repeater bus, commonly referred to as an IRB, is a method for connecting together two or more repeaters which does not use typical LAN media segments. Repeaters typically plug into the IRB as a module in a chassis arrangement. The repeaters connected to the IRB pass data and state information to and from the IRB. The repeater function, now split across Several modules, operates as specified in the IEEE 802.3 standard.

As networks have grown in complexity, businesses have attempted to centralize network connections in one main area. This area has become known as a communications or wiring closet. Contained in the wiring closet are the electronics to provide the LAN connection functions. These are typically housed in a rack or chassis-like device called a hub or a Smarthub. A hub has a multifuntional backplane that provides mounting, power, and data connection services to the servers, bridges, repeaters, and other network modules often added in a modular fashion. The term Smarthub often refers to hubs containing additional logic or a central processing capability (for manageability), rather than being simply a passive coupling device. Many of the network communications devices are considered stations, and operate above the physical layer of the ISO model.

As is also well known in the art, the number of Ethernet repeater functions (hops) that may be placed in any one communications path between any two stations on the LAN is limited by industry standard configuration rules. It is desired that the distributed repeater function implemented across the IRB count as a single repeater hop between any external media connection.

In addition, repeaters are not the only device which needs access to the LANs on the backplane of the hub. Stations are those devices or portion of other devices (modules) which contain the circuitry and Media Access Control (MAC) capability to be a member of the LAN. With the necessity to add more users and interconnect multiple LANs, other communications devices are added to the Smarthub. These devices might include bridges, and routers, servers and gateways. A method is desired by which to efficiently interconnect these modular devices to each other and to the repeaters.

SUMMARY OF THE INVENTION

In accordance with the present invention, a network hub is provided with a backplane having a number of inter-module buses (IMBs) and a global synchronizing mechanism. These IMBs allow for the transmission and reception of LAN data and repeater state information such that the multiple repeater modules are interconnected as one logical repeater function meeting the IEEE 802.3 state and timing requirements. In this manner the IMB is operating as an IRB. In addition, this IMB shall allow stations, as may be contained in MAC bridges, servers, routers, gateway and management devices to also connect to the bus and participate as normal stations on the LAN. All module devices shall be allowed to engage or disengage from the backplane, and IMB, whether powered or not powered. This is commonly referred to as "hot swap". Multiple IMBs are provided to enable several independent interconnect paths, repeaters or stations may be connected to one or more at a time as network configuration requires. A single synchronizing mechanism can serve all independent IMBs.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DETAILED DESCRIPTION

Figure 1:
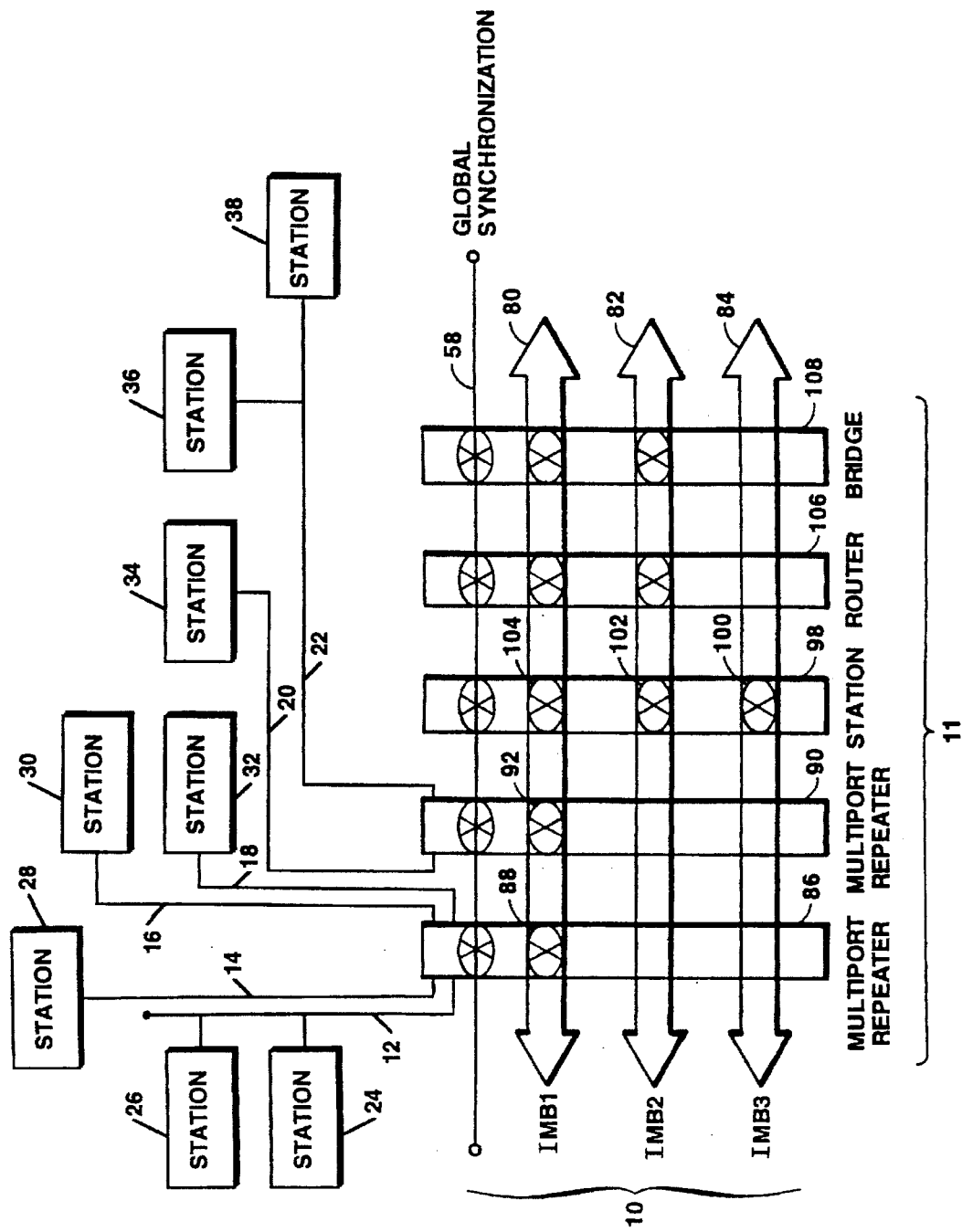
FIG. 1 is a block diagram showing the logical connection in an exemplary LAN Smarthub.

Referring to FIG. 1, a block diagram of a LAN (LAN) Smarthub 10 with a plurality of modules 11 and a plurality of LAN segments is shown. The LAN Smarthub 10 is shown attached to six LAN segments, the LAN segments labeled 12, 14, 16, 18, 20 and 22 respectively. LAN segment 12 is shown as having station 24 and 26. LAN segment 14 is shown as having station 28. LAN segment 16 is shown as having station 30. LAN segment 18 is shown as having station 32. LAN segment 20 is shown as having station 34. LAN segment 22 is shown as having station 36 and 38. LAN segment 12, 14, 16 and 18 are attached to a multiport repeater 86. Multiport repeater 86 joins LAN segments 12, 14, 16 and 18 together into a single LAN. LAN segment 20 and 22 are attached to a multiport repeater 90. Multiport repeater 90 joins LAN segments 20 and 22 together into a single LAN. The LAN Smarthub 10 is also shown as having multiple Inter-Module Buses (IMBs) labeled as 80, 82, and 84, respectively. IMB 80 is shown as providing connection to multiport repeater 86 at point 88. IMB 80 also provides connection to multiport repeater 90 at point 92. With such an arrangement, multiport repeaters 86 and 90 form a single LAN. Via their attachments to multiport repeaters 86 and 90, LAN segments 12, 14, 16, 18, 20 and 22 form a single LAN and operate as a single collision domain.

LAN Smarthub 10 is also shown to provide direct connection of station 98 to IMB 82 through point 102. The IMBs 80, 82, and 84 are also shown to provide connection to router 106 and bridge 108. With this arrangement station 98 can communicate with any of the stations attached to multiport repeaters 86 and 90 through either bridge 108 or router 106. For the IMBs to operate properly a global synchronization mechanism 58 is provided. This mechanism allows the synchronous transmission of data and state information over each independent IMB. Thus, local clocks (not shown) contained within multiport repeaters 86 and 90, station 98, router 106, and bridge 108, are globally synchronized by the global synchronization mechanism 58. Global synchronization mechanism 58 provides synchronization of data flow between any modules connected to the LAN Smarthub 10. For example, data passed from station 24 to station 34 will be synchronized by global synchronization mechanism 58. In this example, station 24 would pass data along LAN segment 12 through multiport repeater 86. This data would then pass to IMB 80 into multiport repeater 90 and then out LAN segment 20 to station 34. Synchronization of the local clocks (not shown) contained in multiport repeaters 86, 90, station 98, router 106 and bridge 108 is provided by global synchronization mechanism 58 (more fully described below).

Global synchronization mechanism 58 may be used to synchronize the local clocks in the modules 86, 90, 98, 106, and 108 in several ways. In one embodiment, a set of master clocks can be passed to each module to be used as their local clocks. Another method would utilize a single pulse train that would be used to phase lock the local clocks on each module together.

Figure 2:
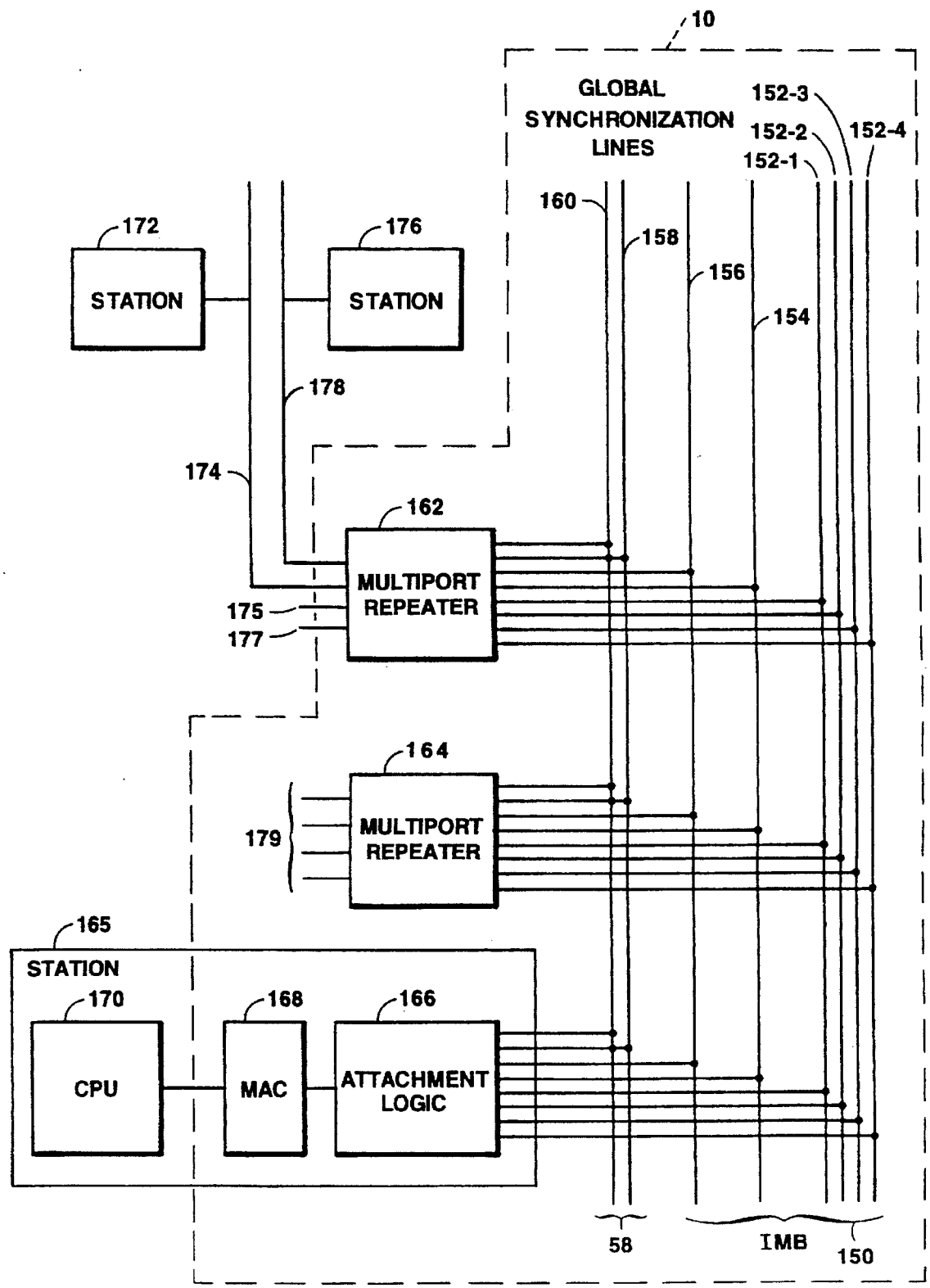
FIG. 2 is a block diagram showing one exemplary Inter-Module Bus (IMB) in an exemplary LAN Smarthub.

Referring to FIG. 2, a block diagram of one exemplary IMB 150 is shown in a LAN Smarthub 10. The IMB 150 is shown as having a plurality of lines. Specifically, the IMB 150 is shown as having six lines; these six lines are four bus request lines (BREQn L) labeled 152-1, 152-2, 152-3, and 152-4, respectively, a global collision line (GCOL L) 154, and a bus data line (BDATA L) 156. These lines are electrically driven utilizing open collector or open drain technology. This type of driver arrangement allows multiple modules to drive the lines simultaneously without incurring any damage or creating erroneous logic levels. The lines operate as a logical Wired-OR function where the logic levels are low true.

In addition to the six lines of the IMB 150, synchronization of data is provided by a single global synchronization mechanism 58. The global synchronization mechanism 58 is shown as having two clock lines labeled 158 and 160. Preferably, global synchronization line 158 should have a clock speed of one half the clock speed of global synchronization line 160. Still more preferable, global synchronization line 158 will run at 10 MHz and global synchronization line 160 will run at 20 MHz. In an alternate embodiment, the global synchronization lines 158 and 160 may be replaced by a single global synchronization line, as discussed more fully with reference to FIG. 7.

By way of example, the lines of the exemplary IMB 150, along with the global synchronization lines 158 and 160, are shown connected to two multiport repeaters labeled 162 and 164, respectively, and station 165. The multiport repeater 162 provides connection to LAN segments 174, 175, 177, and 178, and multiport repeater 164 provides connection to a plurality of LAN segments 179. The station 165 consists of attachment logic 166 which is connected to a media access controller (MAC) 168, which, in turn provides for direct connection of CPU 170 to the IMB 150. Multiport repeater 162 provides connection of station 172 on LAN segment 174 and station 176 on LAN segment 178 to send and receive data to IMB 150 in the exemplary LAN Smarthub 10. In general, the number of BREQ lines, or bits required, are related to the number of modules supported on the bus. This relationship is represented as: number of modules on the bus equal $2^n-1$, where n is the number of bits.

By way of example, the IMB 150 functions in the following manner. A module 162, for example, which desires to transmit data on the IMB 150, places a four bit code on the open collector BREQ lines 215 and proceeds to place decoded serial data synchronized to the global clocks 158 and 160 on the open collector BDATA line 156. Each module utilizes a unique code, preferably its slot ID on the backplane. The code of 1111, i.e., all signals deasserted, is reserved to indicate the IDLE condition. While transmitting, the module 162 continually monitors the bus to ascertain whether a collision has occurred on the backplane. A collision is an event when two or more modules in a network try to transmit at the same time on the same channel, causing transmitted data to be unusable.

A collision on the backplane can be identified in two ways. An active module 162 may fail to receive back its own unique four bit code on the BREQ lines 152 due to having another module simultaneously driving the BREQ lines 152 with its own unique ID, or the open collector GCOL line 154 is asserted by another module 164, for example. Both of these events may occur simultaneously when two or more modules collide.

A transmit collision occurs when the repeater 162 is actually involved in the collision on one of its ports. A receive collision occurs when the repeater 162 is receiving an indication of a collision from its actively receiving port. This type of collision would typically represent a collision between two or more stations attached to the media on the port. Station modules containing a media access controller (MAC) 168 need an additional small block of logic, contained within the attachment logic 166, which logically "ORs" the transmit and receive collisions into a single collision indication.

The IMB 150 operates as an extension of the Carrier Sense Multiple Access with Collision Detection (CSMA/CD). The one exception is that collisions are not enforced on the IMB 150 to the full 96 bits if the remaining bus master, after a collision, is a repeater 162. A multiport repeater is designed according to IEEE 802.3 (ISO 8802.3) so that the minimum packet which is transmitted out of a port of the multiport repeater is 96 bits in duration, regardless of the length of the received transmission that is to be repeated. If a message is less than 96 bits, an extension is done by the multiport repeater at its port level. In order for the MAC 168, which does not inherently do this extension to the length of the received transmission, to maintain synchronization with the rest of the network, it receives input from the attachment logic 166 which tracks the number of bits transmitted. Thus, if the length of the received transmission is determined to be less than 96 bits by the attachment logic 166, it provides a fill of alternating one and zero bits. This fill results in a packet of at least 96 bits being transmitted out to the MAC 168.

The carrier sense portion is provided by the BREQ lines 152. If all the BREQ lines 152 are deasserted, the IMB 150 is considered idle. If any of the BREQ lines 152 are asserted, the IMB 150 is considered active or carrier present. During transmissions, collisions can occur between two or more modules. Since modules that are not actively transmitting cannot discriminate between a single module or multiple modules driving the open-collector BREQ lines 152, it is up to one or more of the modules that are involved in the collision to announce the collision condition to the remaining modules. With repeaters, a collision condition can also exist in the module 164 with stations on a LAN segment connected to the external ports 179 colliding.

When any collision is detected by a module, the module asserts the GCOL line 154. Further, discrimination of whether the collision is a transmit collision or a receive collision is provided by use of the BDATA line 156, which is used to encode the different types of collisions. The BDATA line 156 is dual purpose. During normal packet transmission the BDATA line 156 is used to represent data in bit serial fashion. During collision the BDATA line 156 is used to encode the type of collision, i.e., transmit collision or receive collision. This is fully described below.

Figure 3:
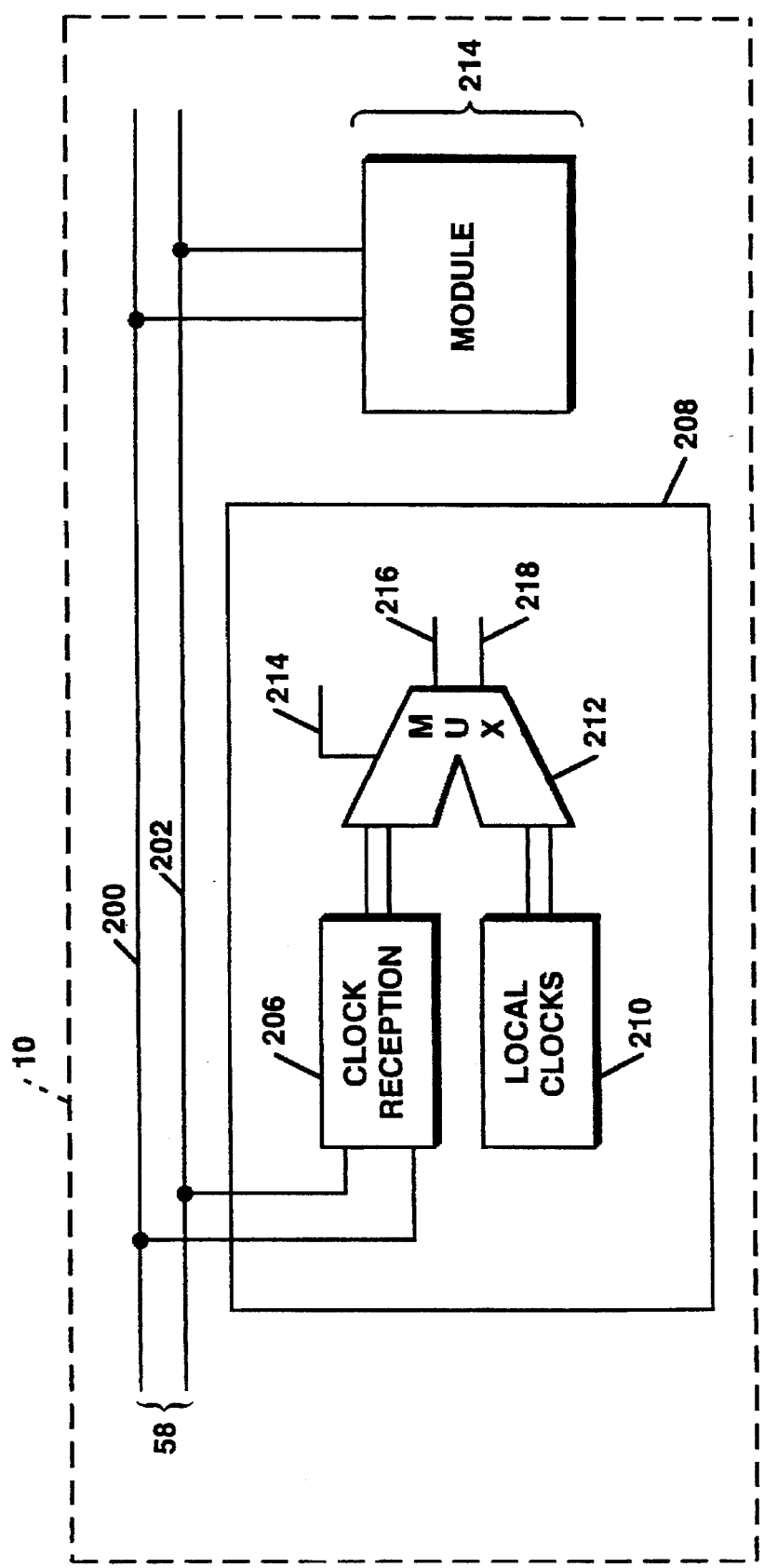
FIG. 3 is a block diagram showing an exemplary global synchronization mechanism in an exemplary LAN Smarthub.

Referring to FIG. 3, a block diagram of a global synchronization mechanism 58 in a LAN Smarthub 10 is shown. In a preferred embodiment, the global synchronization mechanism 58 is shown to consist of two global clock lines labeled 200 and 202, respectively. It is preferable that the global clock line 200 run at twice the rate as global clock line 202. In an exemplary embodiment of the invention, preferred clock rates are for the global clock line 200 to run at 20 MHz and the global clock line 202 to run at 10 MHz. The global clock lines 200 and 202 provide global clock pulses to the plurality of modules 204 within the LAN Smarthub 10. For example, a clock reception apparatus 206 in module 208 receives the global clock lines 200 and 202. While in operation, the global clock lines 200 and 202 provide clock pulses to module 208 and supersede the local clock 210 of module 208. Module clock 216 operates at 20 MHz. Module clock 218 operates at 10 MHz.

The switch from local to global clocks is provided by a two line 2:1 multiplexer 212 that is controlled by selection line 214. The selection line 214 is driven by the control logic on the module and switches from the local clocks 210 to the clock reception logic 206 at the appropriate time. When a module 208 is booting up, the clock multiplexer 212 allows the module 208 to receive clock pulses on module clock lines 216 and 218 from its local clocks 210. After boot-up, the clock multiplexer 212 switches to allow module 208 to receive clock pulses on module clock lines 216 and 218 from global clock line 200 and global clock line 202 through clock reception logic 206.

The bus timing of the IMB 150 (of FIG. 2) is based on a 100 ns cycle, derived from a 10 MHz clock rate, during which one bit of data is presented on the bus. Repeater subsystems, depending on the specific design, require either 20 MHz or 10 MHz to properly encode and decode manchester encoded data that is used in Ethernet communications. 10 MHz is easily derived from 20 MHz using a simple divide by two logic circuit. Unfortunately, providing only 20 MHz to each module would not properly synchronize the IMB data transfers since the derived 10 MHz clocks on each module would not be guaranteed to be in proper phase with each other due to the uncertainty of which 20 MHz clock edge to phase align the derived 10 MHz to.

Figure 4:
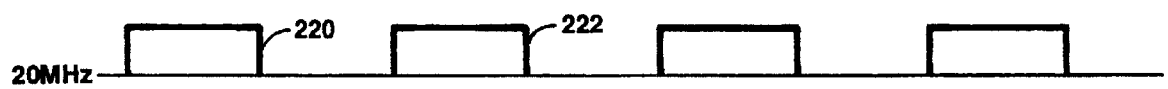
FIG. 4 is a timing diagram showing timing pulses of a timing clock.

Referring to FIG. 4, a timing diagram of the timing pulses of a global timing clock is shown. Specifically, the timing diagram represents the timing pulses of a 20 MHz timing clock.

Figure 5:
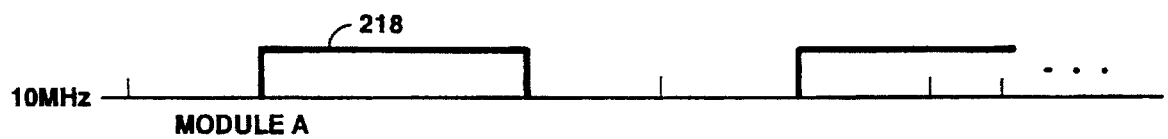
FIG. 5 is a timing diagram showing timing pulses derived from FIG. 7.

Referring to FIG. 5, a timing diagram of the timing pulses derived from FIG. 4 is shown. As can be seen in FIG. 5, a timing clock running at 10 MHz should begin to generate a pulse 218 off the negative edge 220 of the 20 MHz timing pulse of the 20 MHz clock of FIG. 4.

Figure 6:
FIG. 6 is a timing diagram showing timing pulses derived from the wrong edge of a timing pulse of FIG. 7.

Referring to FIG. 6, a timing diagram of incorrect timing pulses derived from FIG. 4 is shown. As can be seen, instead of generating a pulse of the negative edge 220 of the 20 MHz clock, the clock generates a pulse on the negative edge 222 of the second pulse of FIG. 4. Thus, a module following the timing pulse of FIG. 6 will be out of synchronization with the IMB that is operating in phase with the timing of FIG. 5.

Referring again to FIG. 2, the provision of a global synchronization mechanism 58 which distributes the same 20 MHz and 10 MHz clock pulses to all modules, providing the correct synchronization of all modules attached to the exemplary IMB 150.

Figure 7:
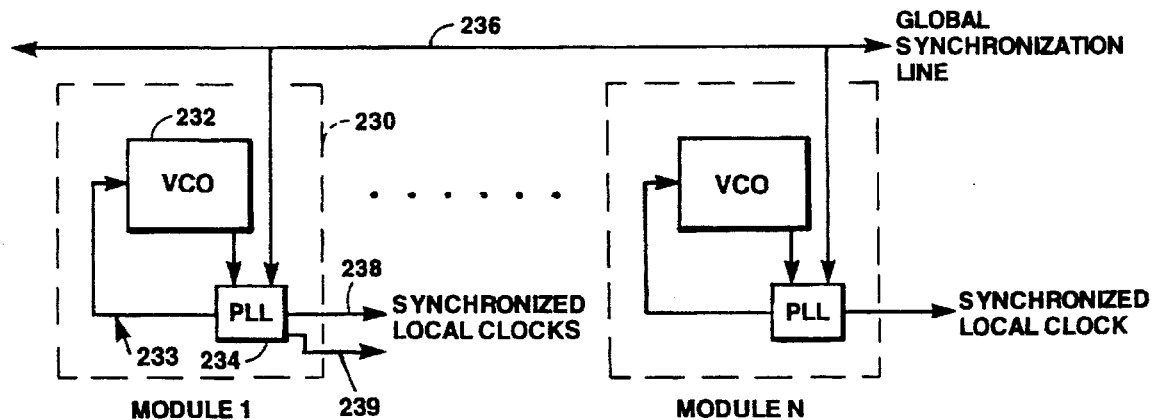
FIG. 7 is a block diagram of an alternate global synchronization mechanism in a LAN Smarthub.

Referring to FIG. 7, a block diagram of an alternate global synchronization mechanism 58 (of FIG. 2) is shown. For example, module 230 contains a local voltage controlled oscillator (VCO) 232 and a phase locked loop (PLL) 234. The PLL 234 is designed to receive output from the VCO 232 and output from a global synchronization line 236. The PLL 234 synchronizes clock pulses between the VCO 232 and the global synchronization line 236 and outputs a synchronized local clock pulse 238. An error signal 233 is provided to pull the local clock into phase with the received clock.

Figure 8:
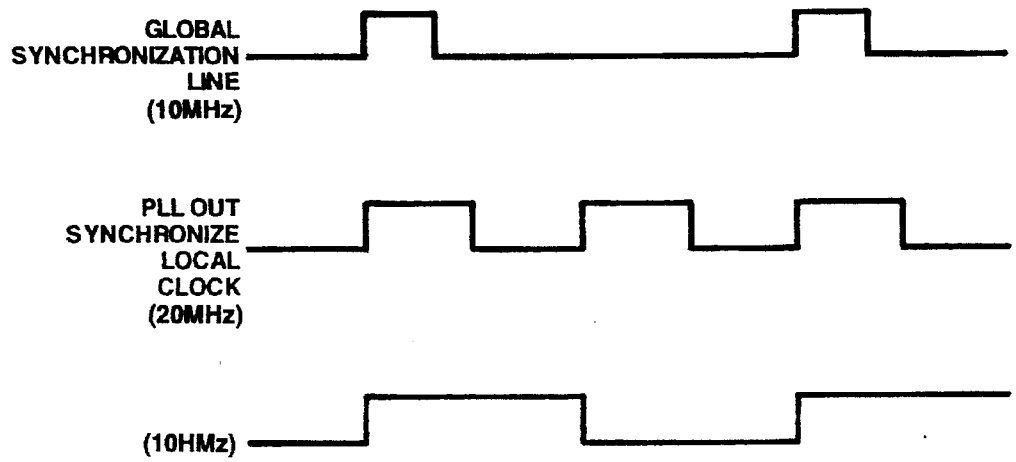
FIG. 8 is a timing diagram of timing pulses derived from the global synchronization mechanism of FIG. 7.

A timing diagram of timing pulses derived from the alternate global synchronization mechanism 58 is shown in FIG. 8. The global synchronization line 236 (of FIG. 7) operates at 10 Mhz and provides the proper phase to base all IMB transmissions on. The synchronized local clocks 238 and 239 operate at 20 Mhz and 10 Mhz respectively.

Figure 9:
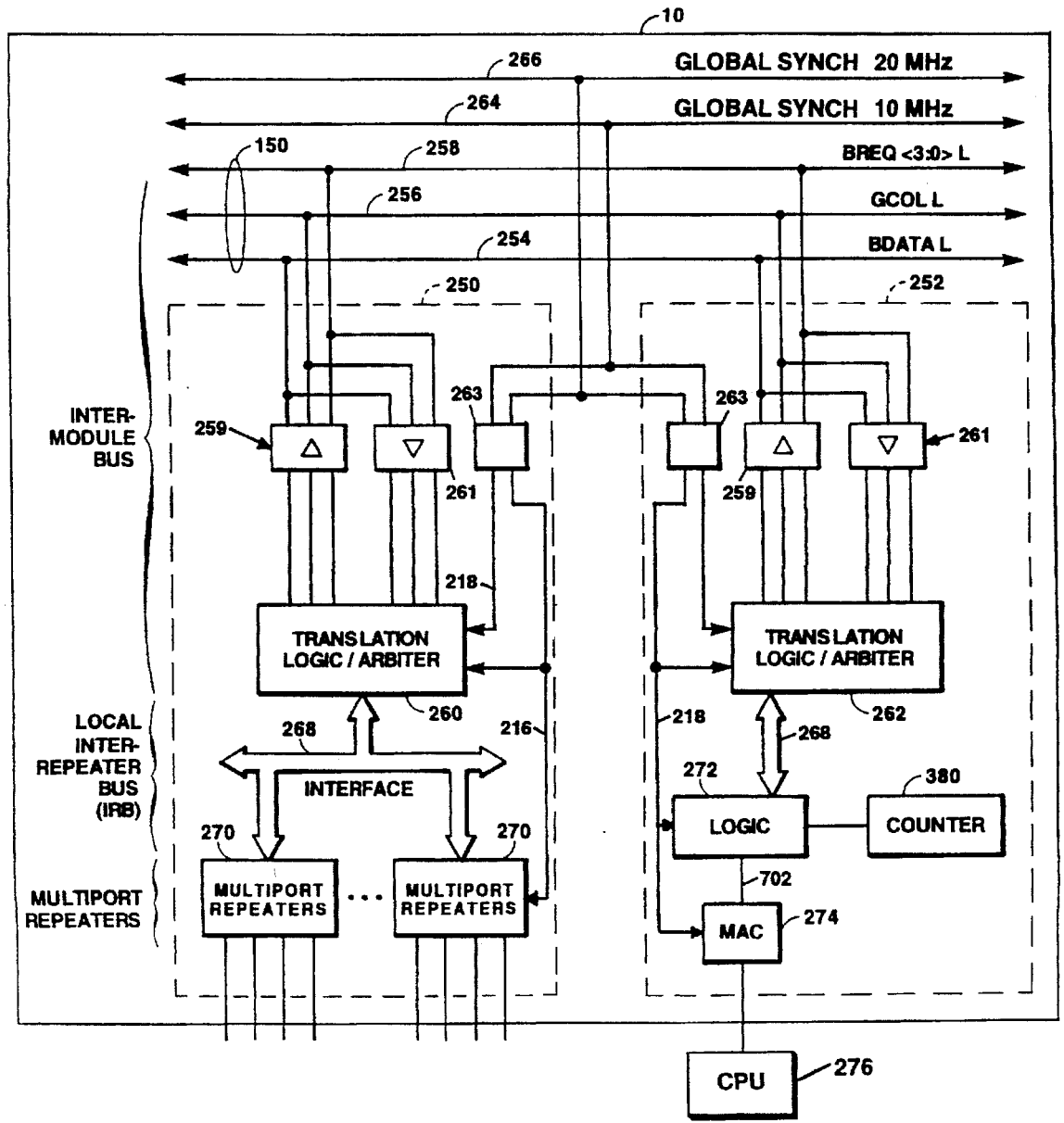
FIG. 9 is a block diagram showing an exemplary LAN Smarthub.

Referring now to FIG. 9, a detailed block diagram of a LAN Smarthub 10 having an exemplary IMB 150 is shown. The LAN Smarthub 10 is shown having two modules labeled as 250 and 252, respectively. Modules 250 and 252 are shown having connections to the BDATA L 254, the GCOL L 256, and the four bus request lines (BREQ <3:0> L) 258. Each module 250 and 252 contains a translation logic/arbiter labeled as 260 and 262, respectively. The translation logic/arbiters 260 and 262 serve multiple roles. Both translation logic/arbiters 260 and 262 provide connection to the BDATA L 254, the GCOL L 256, and the BREQ <3:0> L 258 through signal drivers 259 and receivers 261. Further, the translation logic/arbiters 260 and 262 provide control of the local IRB 268. The IRB 268 provides connection between the translation logic/arbiter 260 and a plurality of multiport repeater integrated circuits (ICs) 270.

The modules 250 and 252 are also shown having connections to global synchronization clock lines 266 and 264. As mentioned above, the global clock line 264 and the global clock line 266 provide synchronization of all elements connected to the LAN Smarthub 10. Clock line 264 operates at 10 MHz while clock line 266 operates at 20 MHz. The clock reception circuit 263 is responsible for generating the module clocks 216 and 218 (of FIG. 3). Module 250 is also shown as having a local inter-repeater bus (IRB) 268. The IRB 268 is fully described with reference to FIG. 11. Module 252, operating as a station, is also shown as having an IRB 268. The IRB 268 provides a connection between the translation logic/arbiter 262 and logic 272, which in turn is used to connect a media access controller (MAC) 274 via interface 702. The inclusion of an IRB 268 allows the use of a common translation/arbiter across all modules. Stations need to incorporate the logic 272 to properly interface MAC devices to the IRB 268 and in turn the IMB 150. The media access controller 274 provides a LAN connection to CPU 276. In addition, an activity counter 380 is provided to logic 272. The logic 272 and the activity counter 380 will be more fully described below with reference to FIG. 12.

Figure 10:
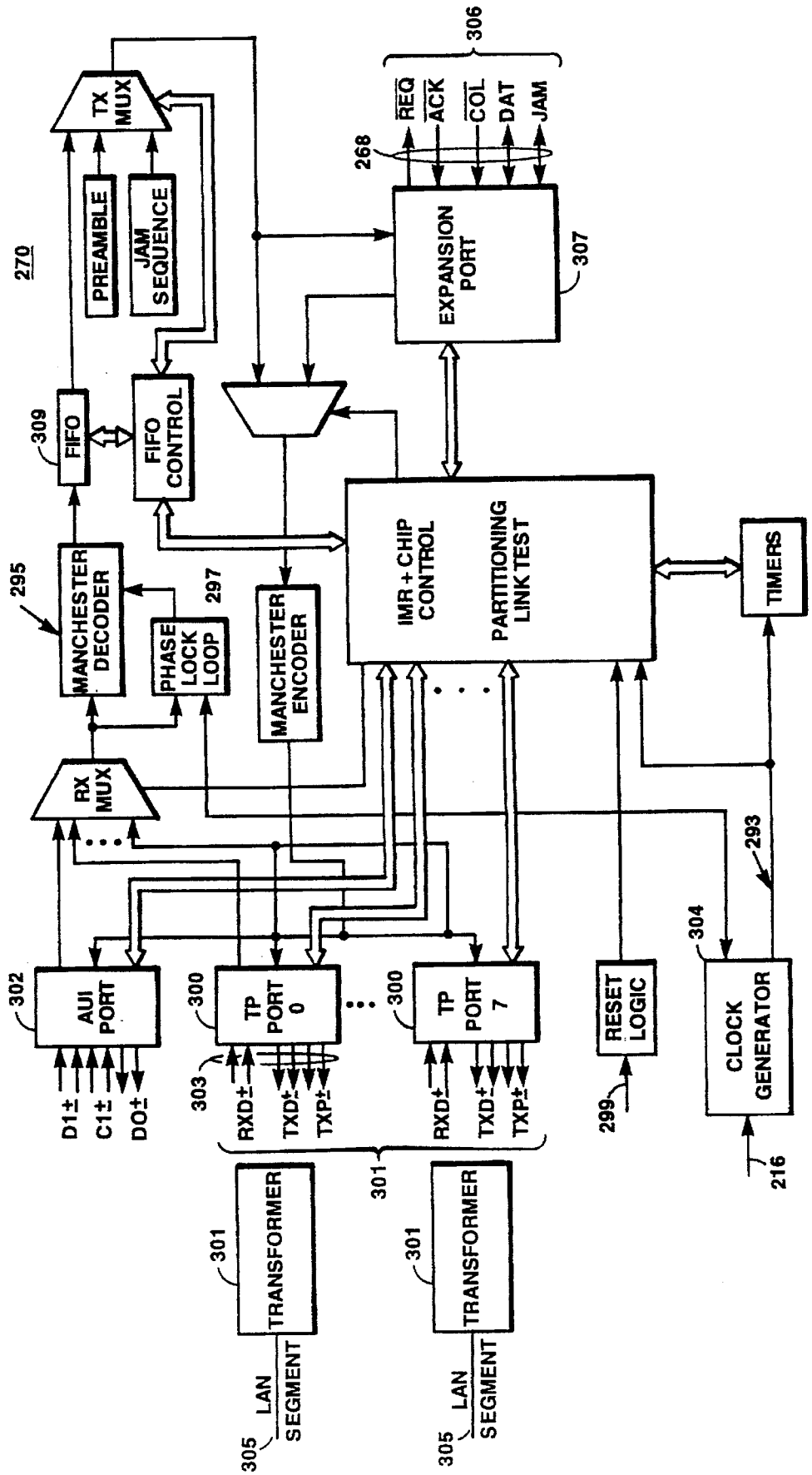
FIG. 10 is a block diagram showing an exemplary multiport repeater.

Referring now to FIG. 10, a block diagram of the multiport repeater IC 270 of FIG. 13 is shown. An exemplary multiport repeater IC 270 is an AM79C981 from Advanced Micro Devices, Inc. The internal arrangement of the multiport repeater IC 279 may, for example, include eight integral Twisted Pair Medium Attachment Units (MAUs) 300 and an Attachment Unit interface (AUI) port 302. The MAUs 300 attach to, for example, the LAN segments 305 through isolation transformers/filters 301. Ports 303 of MAU 300 provide connection to the transformer/filter 301. LAN segments 305 may be, for example, LAN segments 14, 16, 18 and 20 of FIG. 1.

Global synchronization of the MAUs 300 and the AUI port 302 is provided by the module 20 MHz clock 216 and a synchronous reset line 299. Internal synchronization to the proper IMB 10 MHz phase is accomplished by deasserting the reset line 299 at such a time so that the clock generation circuit 304 starts up in phase with the IMB 10 MHz. Expansion port 307 provides connection via lines 306 to IRB 268 of FIG. 9, more fully described with reference to FIG. 11.

In operation, data synchronization within the multiport repeater IC 270 is handled by a manchester decoder 295, phase lock loop 297 and FIFO 309. FIFO 309 is further used to buffer data prior to being passed onto the IRB 268 and the ports 300 and 302 that are transmitting. Data may be passed from stations (not shown) to the multiport repeater IC 270 through the MAUs 300 and AUI port 302. Data that is received by the multiport repeater IC 270 will be controlled by the clocks of the devices sending that data to the multiport repeater IC 270. The clock 293 of the multiport repeater IC 270 will be asynchronous with data flowing through the multiport repeater IC 270. In order to provide a means of synchronization within the multiport repeater IC 270, data is stored in the FIFO 309. Thus, synchronization of the data is provided by storing data in the FIFO 309 and releasing data within the multiport repeater IC 270 in a first-in first out (FIFO) manner. Data comes into the FIFO 309 at a rate determined by the clock of the sending station. This data is read out of the FIFO 309 to the multiport repeater IC 270 in synchronization with the global clock lines 264 and 266.

Data may also be passed through the lines 306 to the multiport repeater IC 270. Data entering from line 306 is already synchronized by global clock lines 264 and 266.

Figure 11:
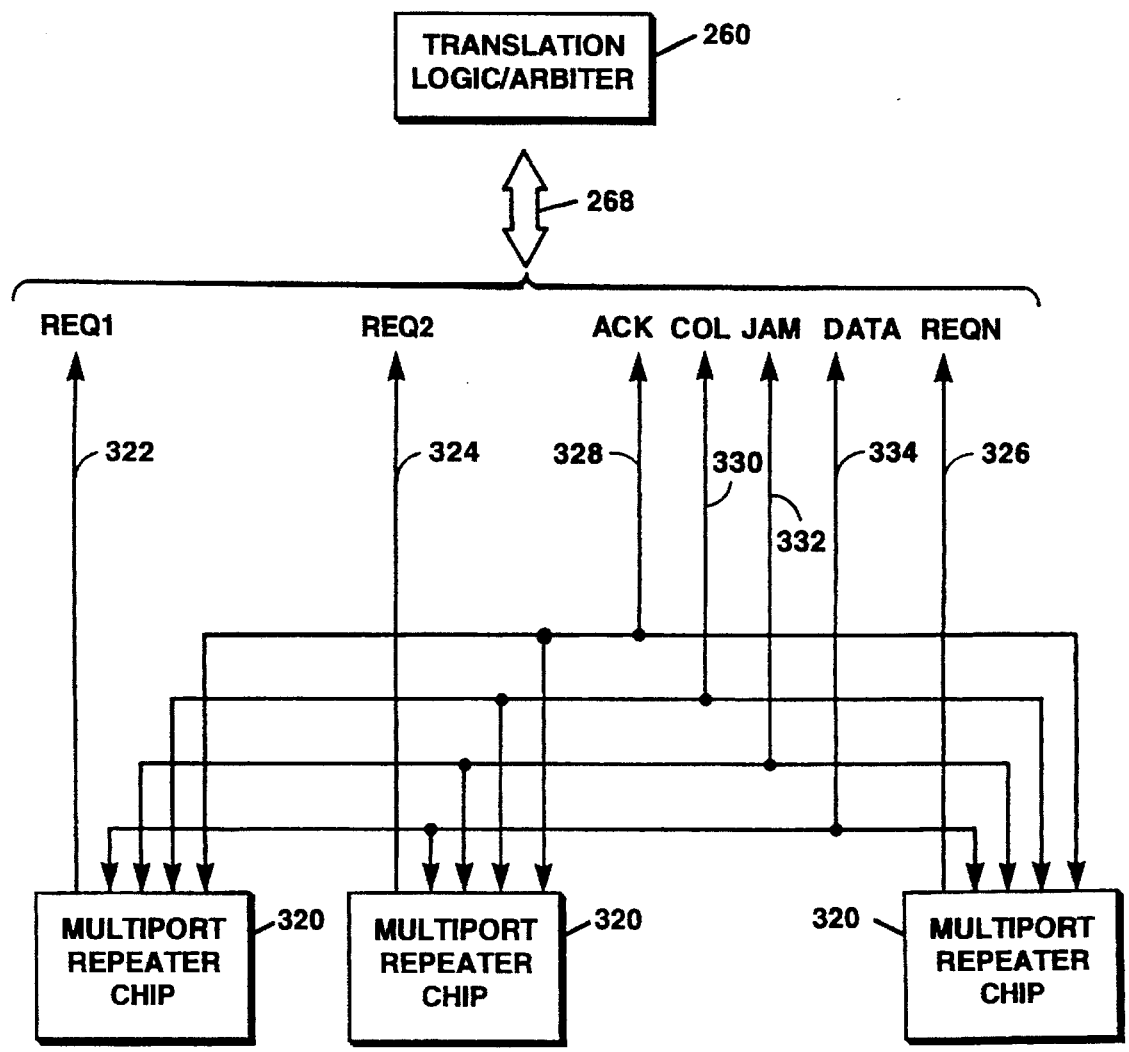
FIG. 11 is a block diagram showing an exemplary Inter-Repeater Bus (IRB)

Referring now to FIG. 11, a block diagram of local IRB 268 is shown. Each multiport repeater IC 320 is shown as having an individual request line labeled 322, 324, and 326, respectively, for connection to the translation logic/arbiter 260 (of FIG. 9). In addition, each multiport repeater IC 320 receives an ACK line 328 and a COL line 33. Bidirectional lines JAM 332 and DATA 334 can be driven by either the multiport repeater ICs 320 or the translation logic/arbiter 260. IRB 268 has lines REQ1 322, . . . REQN 326, ACK 328, COL 330, JAM 332, DATA 334, and other lines such as the module clock lines 216 and 218.

The basic operation of the IRB 268 is as follows. An actively receiving multiport repeater IC 320 asserts its REQN line 326. The translation logic/arbiter 260 asserts the ACK line 328 to indicate a bus grant to the multiport repeater IC 320. If the translation logic/arbiter 260 detects a collision either on the IRB 268 or IMB 150 it will deassert ACK and assert COL causing active multiport repeaters 320 to stop driving the IRB 268 and send a jamming signal on their ports. The DATA line 334 is used to pass Ethernet data during normal transmission. When the device driving the bus, whether the multiport repeater IC 320 or translation logic/arbiter 260, detects a collision, it asserts the JAM line 332 and uses the DATA line 334 to indicated the type of collision detected.

Figure 12:
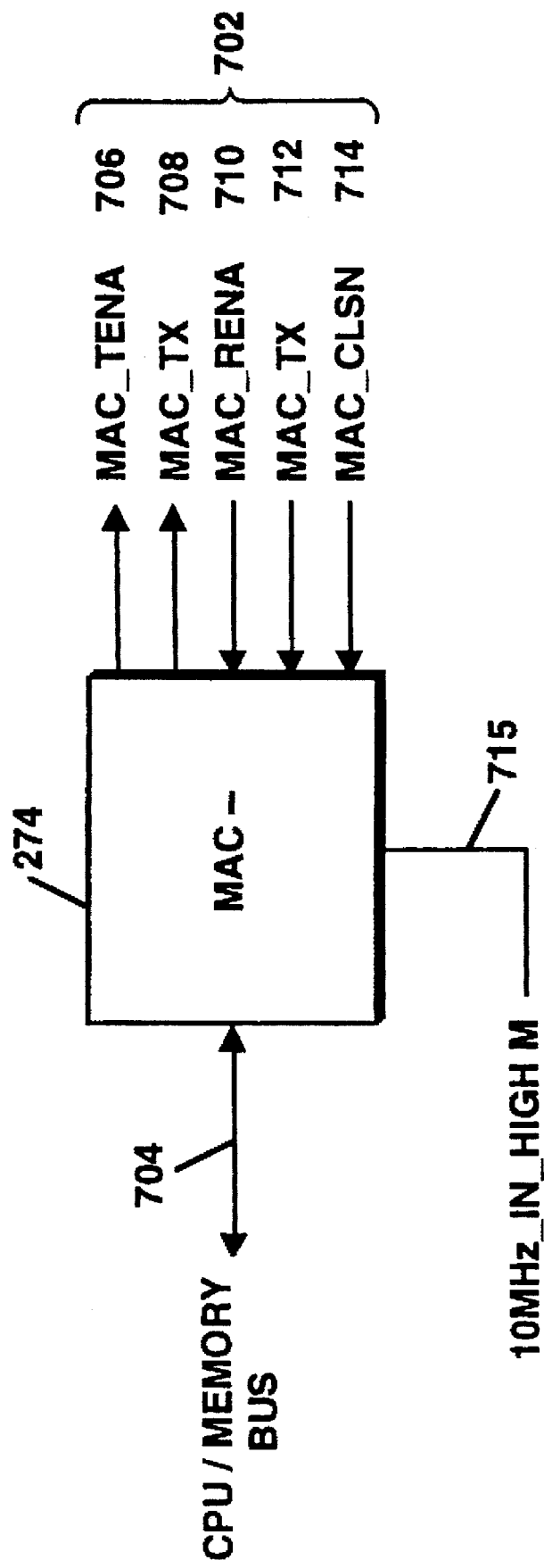
FIG. 12 is a block diagram of a Media Access Controller (MAC) from FIG. 9.

The Media Access Controller (MAC) 274 from FIG. 9 is shown in FIG. 12. MAC devices, such as used in station 252 of FIG. 9, participate on IRB 268 and in turn IMB 150 accesses by following the same protocol for asserting request lines, propagating data, and detecting collisions, as do multiport repeater ICs as is described with reference to FIG. 11. The MAC 274 provides an interface 702 to the logic 272 of FIG. 9. The lines 702 consist of a transmit enable (MAC_TENA H) 706, transmit data (MAC_TX) 708, receive enable (MAC_RENA H) 710, receive data (MAC_RX) 712 and collision indication (MAC_CLSN) 714. The MAC also contains an interface to a CPU/Memory bus 704. The MAC is synchronized by the module's 10 MHz clock 715.

The operation of the MAC 274 is to take data to be transmitted from bus 704 and place it bit serial on the MAC_TX line 708. The MAC simultaneously asserts the MAC_TENA line 706 to indicate to logic 272 that valid data is on the MAC_TX line 708. While transmitting the MAC 274 continuously monitors the MAC_CLSN line 714 to detect a network collision. The receive process is activated by the MAC_RENA line 710 being asserted by the logic 272. When MAC_RENA 710 is asserted the MAC_RX line 712 is driven by logic 272 with bit serial receive data. Again the MAC 274 monitors the MAC_CLSN line 714 to detect a network collision. The serial receive data is then placed on the bus 704.

Referring to FIG. 13A, FIG. 13B, FIG. 13C and FIG. 13D, a schematic of a combined translation logic/arbiter 260 of FIG. 9 and MAC interface logic 272 of FIG. 9 is shown. The majority of the logical functions are contained within two PAL devices 390 and 392. The PAL equations are included as Appendix 1. PAL 390 implements several functions: It consolidates the plurality of request lines, IMRn_REQ L 598-1, 598-2, 598-3, and 598-4, from the multiport repeater ICs 320 of FIG. 11 into two signals ANYREQ H 65C and SINGLEREQ H 652; It implements the MAC to IRB interface logic 272 of FIG. 13. The IRB signals are named IRB_ACK L 600, IRB_COL L 602, IRB_DATA H 604 and IRB_JAM H 606. Along with these major functions the PAL 390 also controls the activity counter 380 and the main reset logic in conjunction with timing circuit 397. The main reset logic insures that multiport repeaters and MAC devices are not enabled onto the IMB until the bus is idle for at least six microseconds, this number being less than the interpacket gap. The PAL 390 interfaces to the main IMB state machine PAL 392 via signals ANYREQ H 650 and SINGLEREQ H. Using these two signals PAL 392 implements the IRB 268 control logic. PAL 392 drives the IMR_ACK L 600 and IMR_COL L 602 for all cycles. PAL 392 also drives the bidirectional lines IMR_DATA H 604 and IMR_JAM H 606 during IMB receptions or collisions. PAL 392 drives the IMB control signals IMB_GCOL_OUT 608 and IMB_BDATA_OUT 610 through BTI, transceiver 395 onto the IMB interface connector 634. BTL transceivers are chosen for their hot-swap capabilities and due to their high impedance/low capacitance outputs. The precharge feature of the BTL Transceivers is accomplished by connecting the VCC Bias Pin 506 of the devices to a precharge pin 504 on the backplane connector. The backplane connector precharge pin is elongated such as the precharge signal asserts prior to any other backplane signal. The VCC Bias Pin 506 biases the output stage of the BTL transceiver such that it places it into a high impedance state that will not interfere with any backplane signal it attaches to. The BTL transceivers are also inverting, which results in true-low logic on the IMB. The BTL transceiver 395 also drives the unique module ID 350 onto the connector's IMB BREQ L lines 614 when activated by the signal EN_ID H 616. Connector 634 plugs into a backplane which properly terminates all the IMB signals in a low impedance pull-up resistor circuit that biases the open collector BTL drivers. The BTL transceiver also receives the IMB signals 150 and creates IMB_GCOL_IN H 628, IMB_DATA_IN H 630 and BREQ_IN<3:0> H 632. These in turn are connected to a sampling latch 393. The sampling latch 393 then in turn drives the four sampled BREQ lines, SBREQ<3:0> H 622 into the activity and collision detect logic 394 and the sampled IMB signals SCOL_IN H 624, SBATA H 626 into the main IMB state machine PAL 392. BTL transceiver 353 receives the global synchronization clocks CLK10 L 264 and CLK20 L 266. The received BUS_20 MHZ H 267 and BUS_10 MHZ H 265 are in turn connected to the clock reception flip-flop 355 which de-skews the BUS_10 MHZ 265 H with respect to BUS_20 MHZ 267. The BTL transceiver is also used to implement the multiplexer function 212 of FIG. 5. This is controlled by signal INT_CLOCK L which selects between the local clocks 391 and the received clocks 264 and 266. The local clocks are created by timing logic 656. Flip-flop 355 drives module clock 10 MHZ_IN_HIGH 218 and its inverse 10 MHZ_IN_LOW L 219. Logic block 397 is responsible for creating the Sync Reset 299 used by devices such as the multiport repeater ICs 270 of FIG. 9. This block insures that the internal clock of these devices is in phase with the IMB CLK10 L clock 264. By placing the unique module ID 350 onto a backplane channel that was previously idle, as indicated by the idle signal 500, the module attempts to acquire the bus. By monitoring the MATCH_OK H signal 502 the module can ascertain that the unique ID that was placed on the bus is being read back and matches that placed on the backplane. Once the module has acquired the bus, every cycle of the module continues to monitor the MATCH_OK H signal 502 and IMB_GCOL_IN 628 to recognize whether it still has the bus without a collision.

Once the module has acquired the bus it begins driving the data serially out on the IMB_BDATA_OUT 610 such that all other modules on the bus can receive it. A receiving module would have identical logic such that the BIDLE_H 500 signal would deassert, indicating bus activity and the subsequent delivery of data on the BDATA_L 254 that it can receive. While the module is transmitting onto the IMB 150, the activity and collision detect logic 394 continually monitors the SBREQ lines 622 to ascertain whether a collision has occurred on the IMB 150. A collision on the IMB 150 can be identified when an active module fails to receive back its own unite ID code on the BREQ L lines 614, or the GCO1, line 256 is asserted by some other device connected to the IMB.

A collision while transmitting data is detected by the XOR gates 356-1, 356-2, 356-3 and 356-4, indicating the module ID code 350 asserted on the open collector BREQ L lines 614 differs from the signal received on the same BREQ L lines 614. If the received code matches that which was driven, no collision has been detected and the state machine PAL 392 continues to drive the IMB 150 with data. If IDs asserted and read fail to match, then collision has occurred and must be handled by the PAL 392. The handling of collisions will be discussed more fully below. Along with the logic within PAL 390, the MAC 274 of FIG. 12 requires a transmit activity counter 380 to track port activity. A multiport repeater is designed according to IEEE 802.3 (ISO 8802.3) so that the minimum packet which is transmitted out of a port of the multiport repeater is 96 bits in duration, regardless of the length of the received transmission that is to be repeated. If a message is less than 96 bits, an extension is done by the multiport repeater at its port level. In order for the MAC 274, which does not inherently do this extension to the length of the received transmission, to maintain synchronization with the rest of the network, it receives input from PAL 390 which uses the transmit activity counter 380 to track the port activity, i.e., the number of bits transmitted. Thus, if the length of the received transmission is determined to be less than 96 bits as indicated by the activity counter 380, the logic in PAL 390. This is the distributed nature of the collision detect circuitry. Each active module participates in detecting the collision. Each active module that detects this collision condition is responsible for announcing the collision by driving the IMB_GCOL_OUT H 610 signal which in turn asserts the GCOL L 256 signal on the bus. provides a fill of zero bits. This fill of alternating one and zero bits results in a packet of 96 bits being transmitted to the MAC 274.

Figure 14:
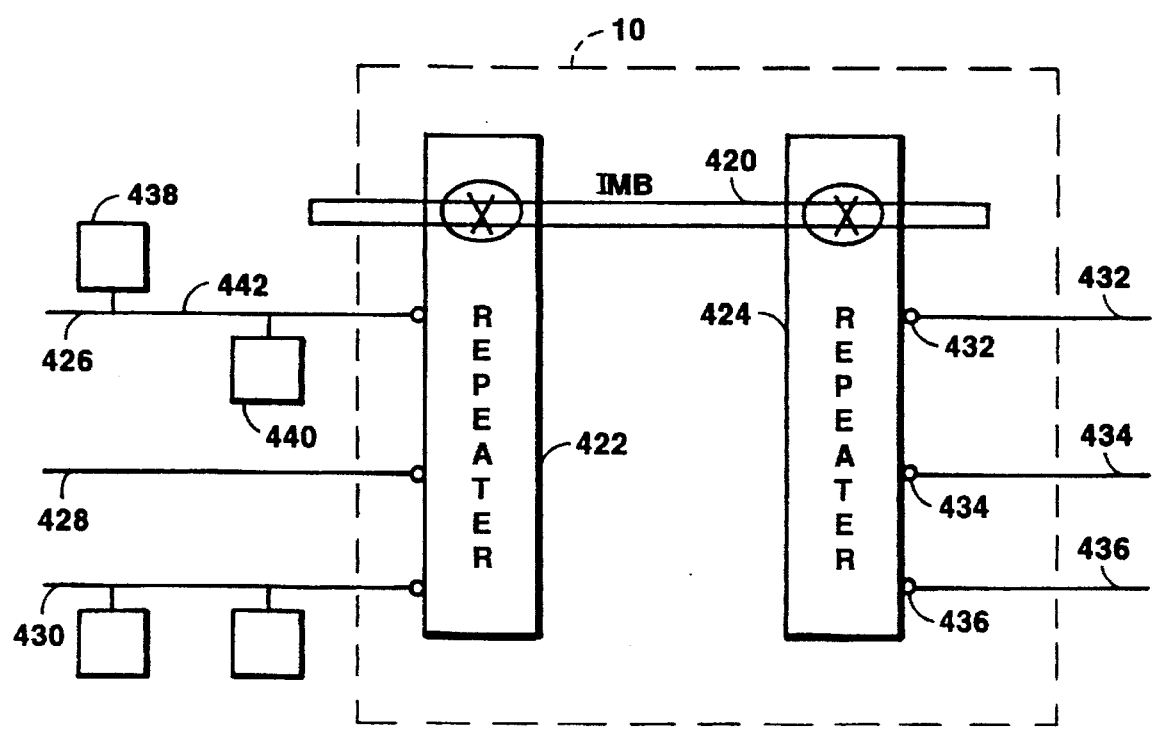
FIG. 14 is a block diagram of collision detection in an exemplary LAN Smarthub.

Referring to FIG. 14, a block diagram of collision detection in a LAN Smarthub 10 is shown. The LAN Smarthub 10 is shown as having an IMB 420 providing connection to two multiport repeaters labeled as 422 and 424, respectively. Multiport repeater 422 is shown as having three LAN segments labeled as 426, 428, and 430, respectively. Multiport repeater 424 is shown as having three LAN segments labeled as 432, 434, and 436, respectively. Recalling that an IMB 420 contains four bus request, lines, a global collision line, and a bus data line, collisions can occur in several ways.

Figure 13A:
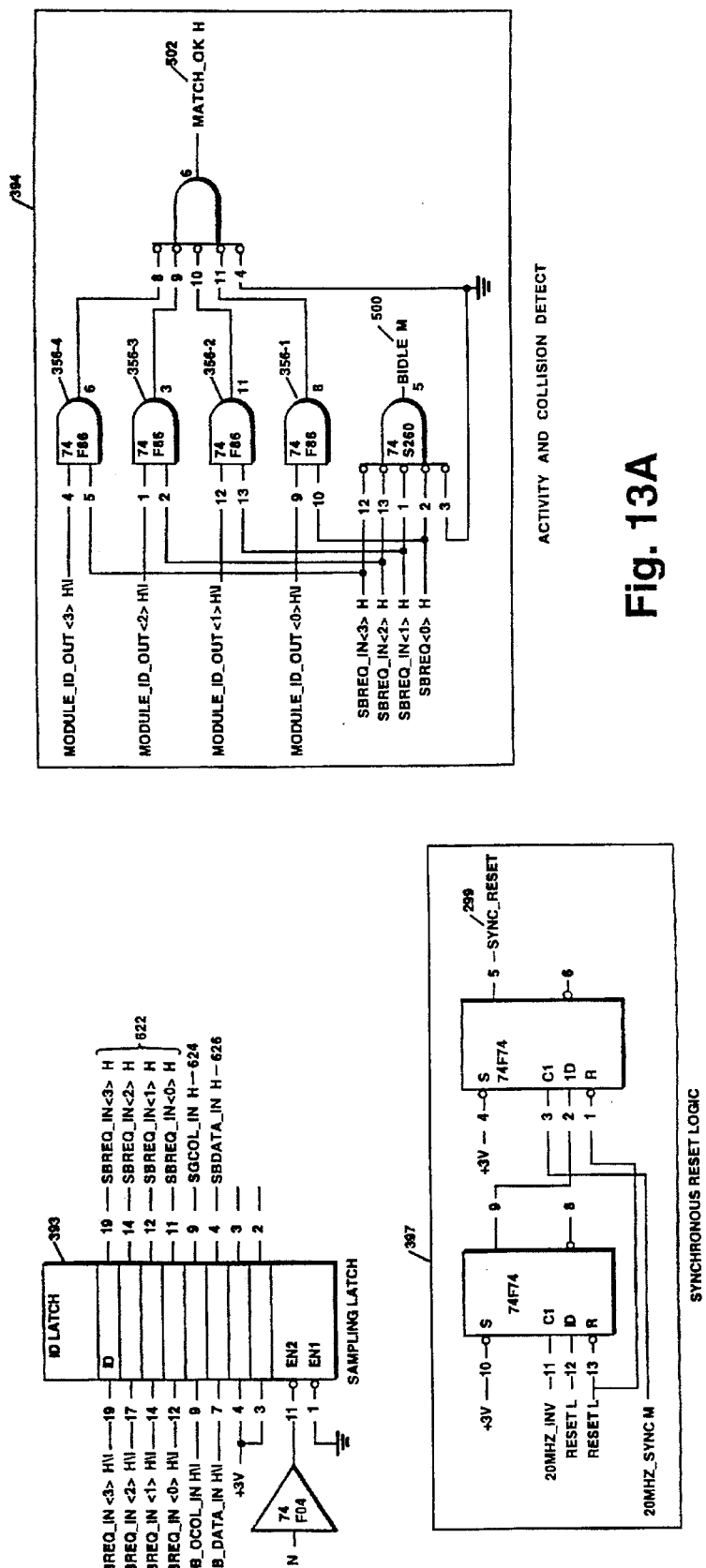
FIG. 13A, FIG. 13B, FIG. 13C, and FIG. 13D are the circuit schematics of a IMB interface.
Figure 13B:
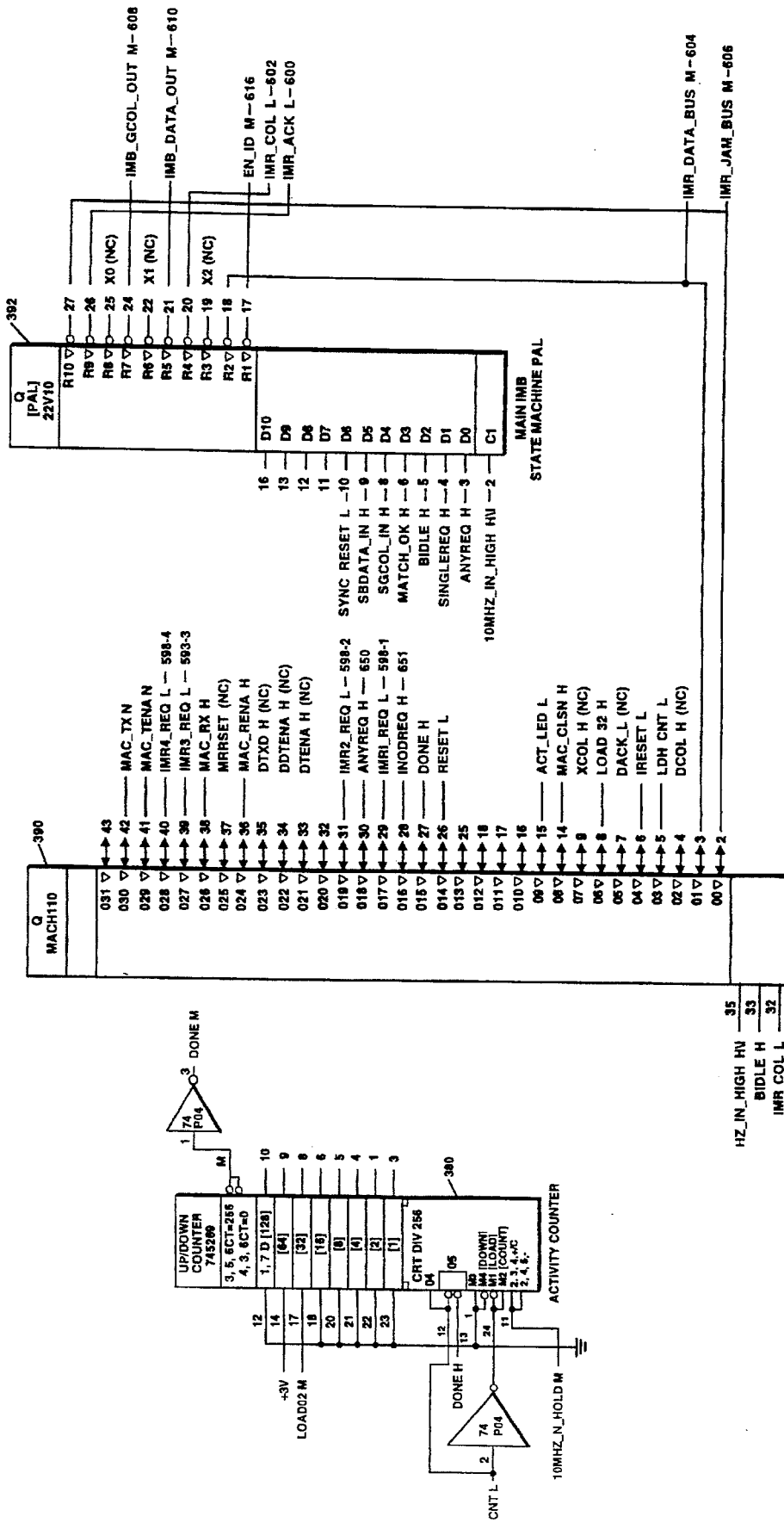
Figure 13C:
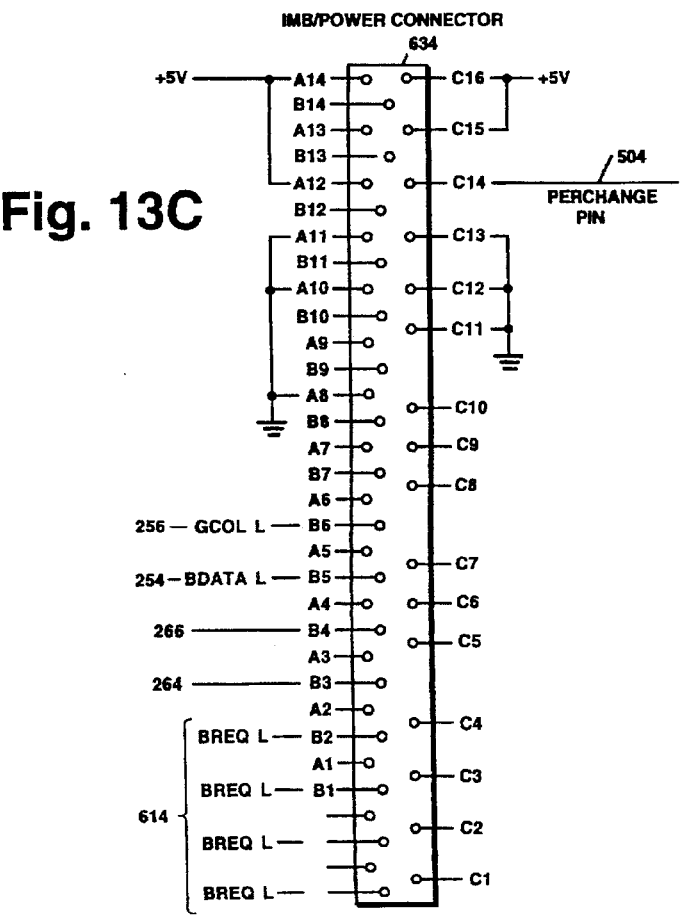
Figure 13C:
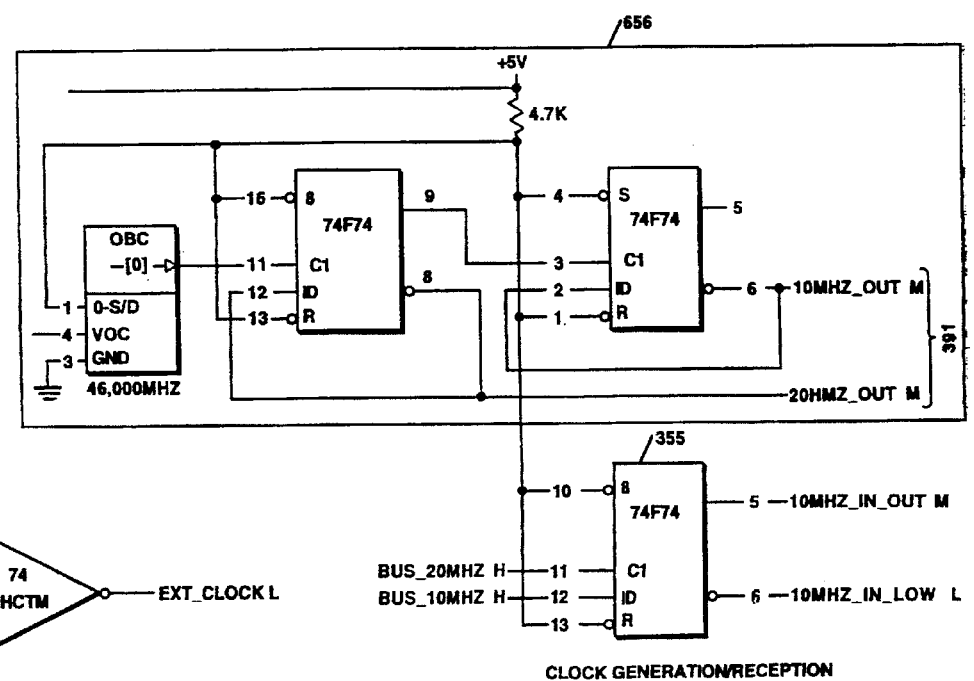
Figure 13D:
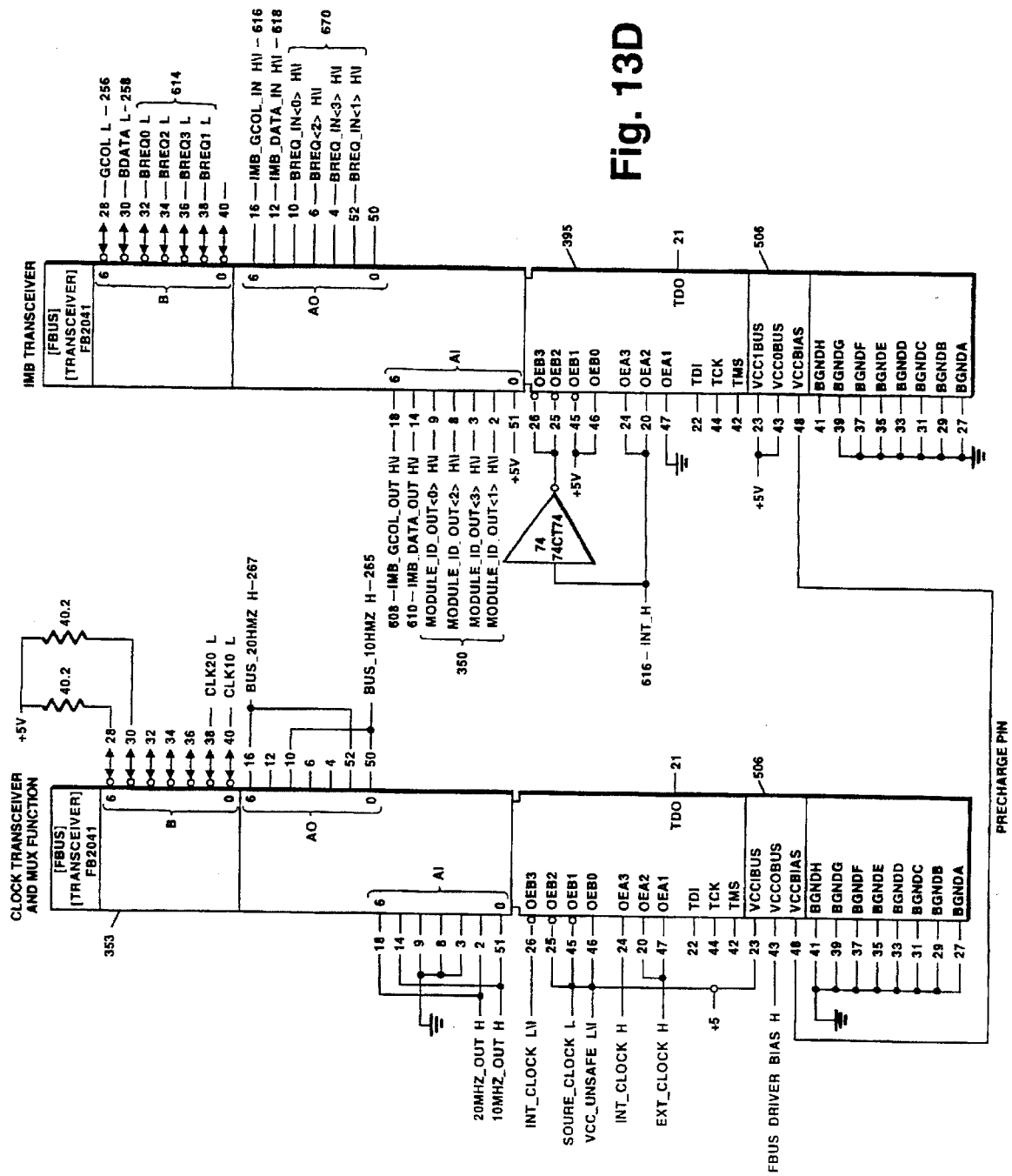

The first type of collision is that which occurs when two or more multiport repeaters (422 and 424, for example) become active and attempt to simultaneously drive the bus 420; this is referred to as a bus collision. In this case, at least one of the multiport repeaters 422 will recognize the fact that it does not read back the bus request (BREQ) code it is supposedly driving onto the bus 420, as shown in FIG. 13A. When this occurs, the multiport repeater 422 recognizing the collision is responsible for announcing the collision to the other multiport repeaters involved in the collision, as well as to the inactive modules that are receiving the data. This announcement is done by asserting the global collision line ((GCOL) and bus data line (BDATA) simultaneously. In the case of a multiport repeater 422 recognizing a collision on the bus, the GCOL line and BDATA line are maintained asserted as long as it continues to recognize the collision. Once a collision is announced, all multiport repeaters put themselves in a transmit collision (TXCOL 476 of FIG. 15) state. Once the bus collision ends, there is a single remaining multiport repeater 422 driving the bus 420. This multiport repeater 422 will recognize its own code on the BREQ lines and will stop driving the GCOL line, but will continue to drive the BDATA line. Once multiport repeater 422 reads back the GCOL line as deasserted, it learns that no other module is recognizing a collision.

This step of waiting until the GCOL line is deasserted before checking the BREQ lines for its own identifier code is important because during a collision, a multiport repeater 422 could read back its own ID in the event that a second multiport repeater's 424 ID has a subset of the same bits asserted. Two codes can alias to a single code such that only one multiport repeater 422 detects the collision. For example, both codes 6, i.e., "0110", and 2, i.e., "0010", alias a code of 6, i.e., "0110," allowing only the multiport repeater 422 with a code of 2 to recognize the collision. The second multiport repeater 424, code "0010", would recognize the collision while the first multiport repeater 422, code "0010," would not. Thus, only when a multiport repeater 422 reads back its own ID and GCOL deasserted does it know that it is the last remaining multiport repeater on the bus 420.

The second type of collision condition is one that occurs between two or more ports on a multiport repeater 424. This type of collision is referred to as a transmit collision. For example, a collision occurs when both a station on a LAN segment 426 and a station on a LAN segment 428 collide. Multiport repeater 424 is shown as having three ports labeled as 432, 434, and 436, respectively. When this second type of transmit collision occurs, the fact that the collision occurred must be propagated to the rest of the network. The multiport repeater 424 experiencing the collision initially asserts both the GCOL and BDATA lines to indicate that a transmit collision is occurring, but on subsequent bus cycles it only asserts BDATA. In this way, it can recognize any bus collisions that may occur later. If this or any other active multiport repeater were to recognize a bus collision by virtue of not reading back its BREQ code, it would then assert GCOL.

Figure 15:
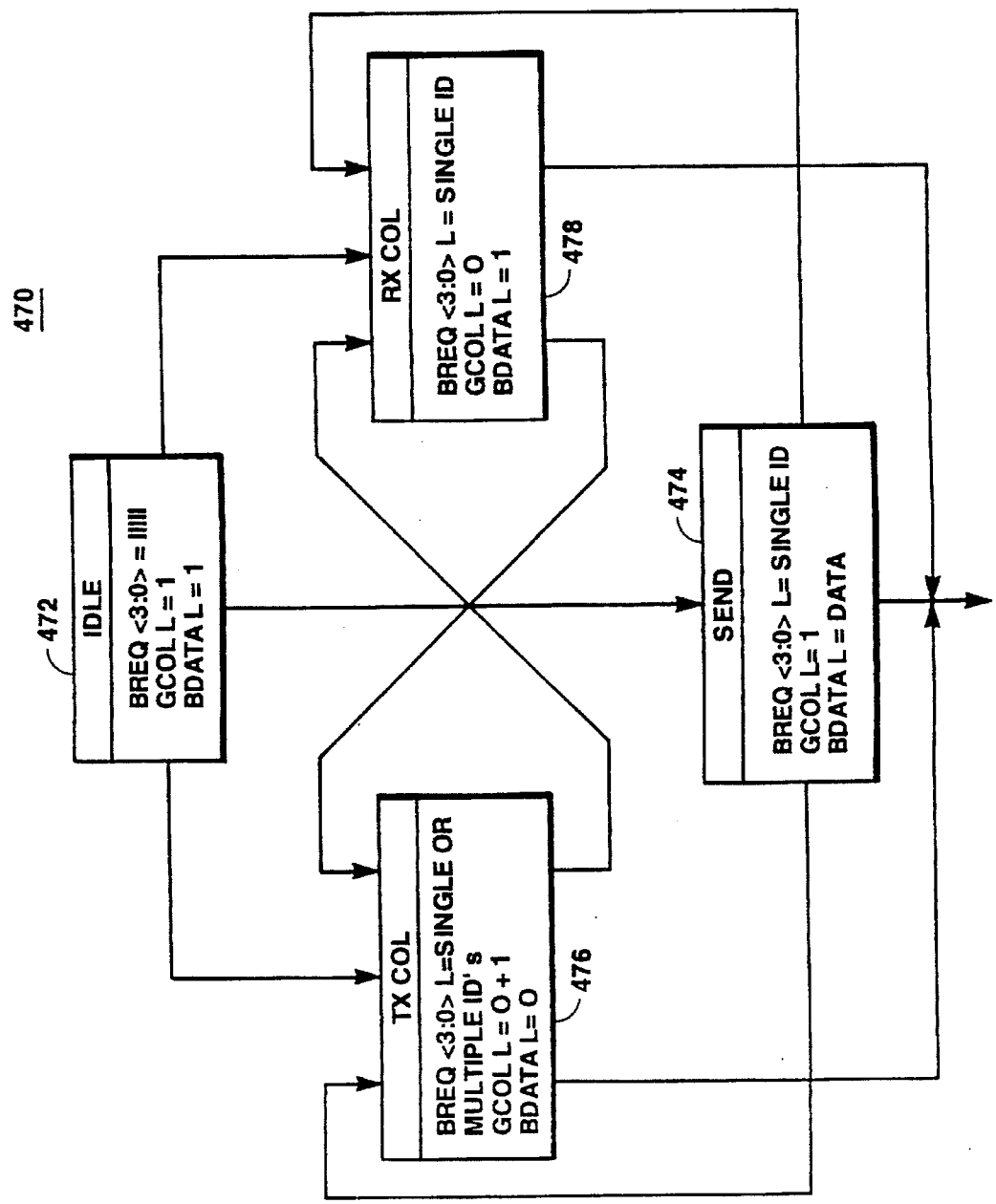
FIG. 15 is a block diagram showing a state diagram for a IMB.

The final type of collision is termed a receive collision (RXCOL 478 of FIG. 15). This type of event is one where a multiport repeater 422 senses a collision occurring on the media attached to it but is not actually involved in the collision; i.e., a collision between station 438 and station 440 on a LAN segment 442. Multiport repeater 422 must then propagate this event to the rest of the network by way of a jamming signal (JAM), i.e., the collision is sent to all multiport repeaters on the bus 420. A JAM, which is asserted on the GCOL line, nay occur when a collision has been detected and the transmitter must transmit a "jamming" pattern for a sufficient period of time to ensure that the other station(s) involved in the collision also detect the collision. Once the jamming signal has been sent, the transmitter must defer for some period of time before attempting to access the station again. A JAM is also used to propagate network activity to segments that are not actively involved in the collision; it is an invalid packet but maintains network synchronization.

There is also another type of event that is grouped with the receive collision 56. This event is a "one port left" condition. In this case when a transmit collision ceases, there is a possibility of only having one active port. In this case, the multiport repeater is responsible for not colliding with the remaining port, but propagating the remaining activity to the rest of the network by way of a JAM. Both of these events are viewed the same by the remainder of the network and can be grouped as one type of bus cycle. In either case, the encoding is to assert CGOL 74 and not assert BDATA 76.

Referring to FIG. 15, a block diagram showing a state machine 470 which is implemented by the PAL 392 (of FIG. 18A) is shown. The state machine 470 shows four distinct states that may exist on the bus: IDLE 472, SEND 474, TXCOL 476, and RXCOL 478. The IDLE state 472 is encoded as BREQ <3:0> being deasserted. On an open collector bus this is represented as all bits at logic high (i.e., all "1s"). During the IDLE state 472 the BDATA line and the GCOL line should also be deasserted. The SEND state 474 is entered when one multiport repeater or station module asserts its unique four bit code ID onto the BREQ lines. Once in the SEND state 474, the single bus master proceeds to drive serial decoded data on the BDATA line. During this time the GCOL line stays deasserted.

Figure 16:
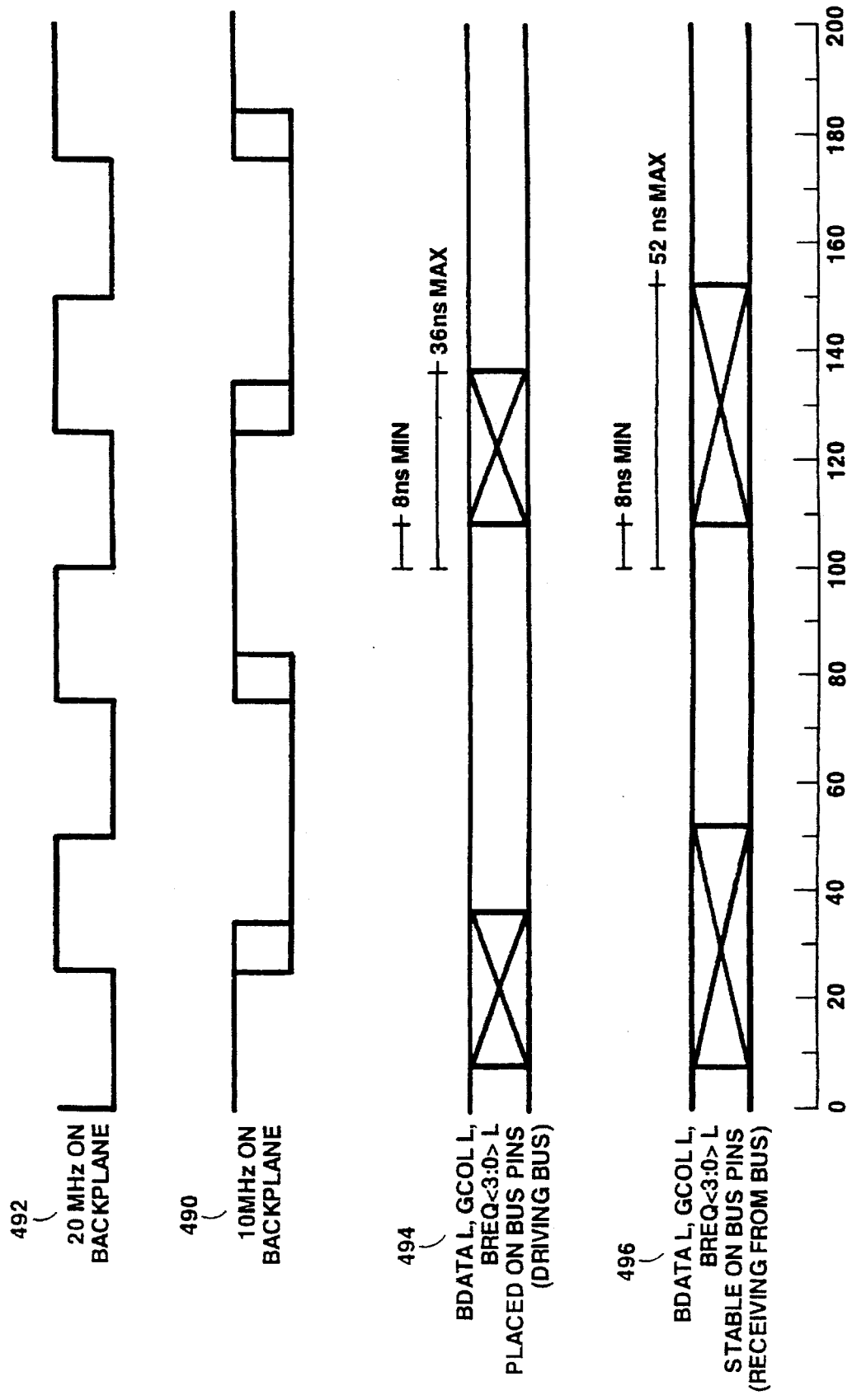
FIG. 16 is a timing diagram for an exemplary IMB.

Referring to FIG. 16, a timing diagram for a LAN Smarthub 10 is shown. The timing diagram shows a 10 MHz clock 490 and a 20 MHz clock 492. The 20 MHz clock 492 is shown as the reference, while the 10 MHz clock 490 is shown with its minimum and maximum (min/max) skew with respect to the 20 MHz clock 492. Line 494 represents the min/max delay that a driving module is allowed to introduce in driving the inter-module bus signals BDATA, GCOL, and BREQ <3:0> with respect to the 20 MHz 492 reference. Line 496 represents the min/max timing that can be expected by a receiving module on these same bus lines with respect to the 20 MHz reference 492.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

Atty. Dkt. No. PD93-00393
Ilyadis & Graham

APPENDIX 1
---- PAL 390 -----

Name Request Consolidation, MAC interface and Reset logic
PAL
Device    mach110;
Format    ef;

```
*****************************************************************
*  Allowable Target Device Types:  MACH110-12/15                 *
*****************************************************************

/** Inputs **/
PIN 35 = clk10mhz;  /* CLOCK IN */
PIN 13 = invclk10mhz;  /* Neg CLOCK IN to drive DATA and
JAM on IRB bus */
PIN 33 = bidle; /* IMB bus idle */
PIN 11 = !rst;  /* async reset */
PIN 20 = !micro_rst;   /* micro reset  */
PIN 32 = !col;  /* IMB collision */
PIN 10 = !ack;  /* IMB ack */
PIN 41 = tena;  /* MAC tena */
PIN 42 = txd;   /* MAC tx data */
PIN 21 = done;  /* 64/96 bit counter done */
PIN 25 = !imr1_req; /* IMR 1 Request */
PIN 27 = !imr2_req; /* IMR 2 Request */
PIN 39 = !imr3_req; /* IMR 3 Request */
PIN 40 = !imr4_req; /* IMR 4 Request */
PIN 19 = en_outputs; /* Output enable for mnfct */

/* outputs */
PIN 6 = irst;/* 10mhz IMR rst to be externaly */ clked by
20mhz */
PIN 2 = jam;   /* IMB jam I/O */
PIN 3 = data;  /* IMB data I/O */
PIN 43 = mac_req;   /* MAC req to IMB */
PIN 7 = dack;  /* delayed ack */
PIN 4 = dcol;  /* delayed IMB col */
PIN 9 = xcol;  /* 1 bit extended transmit col */
PIN 14 = cdt;  /* MAC col - min 96 bit extended*/
PIN 5 = ldh_cntl; /* 64/96 bit cntr load/cnt control*/
PIN 8 = loadcntl; /* selects 64 or 96 bit count on ctr*/
PIN 29 = dtena; /* delayed MAC tena */
PIN 30 = ddtena; /* 2 clk delayed MAC tena */
PIN 31 = dtxd;  /* delayed MAC tx data */
PIN 38 = sdata;  /* delayed MAC rx data - 2 clk delayed tx
data*/
PIN 36 = rena;  /* MAC rena */
```

— 32 —

Atty. Dkt. No. PD93-00393
Ilyadis & Graham

```
PIN 37 = s_mreset;    /* synced micro reset */
PIN 26 = any_req;     /* any request to imb pal*/
PIN 24 = single_req;  /* single request to imb pal */
PIN 15 = !act_led;    /* Activity LED */

*************************************************************
* Intermediate variables improve readability of equations    *
*************************************************************
/* local stuff */

$DEFINE   GND 'b'0
$DEFINE   VCC 'b'1

*************************************************************
/*                    output equations
************************************************************* mac_req.d = dtena & dack & !cdt # tena; /* extended req to
IMB from MAC */
dack.d = ack; /* delayed IMB ack */
dtena.d = tena;   /* delayed MAC tena */
ddtena.d = dtena;        /* two clk delayed MAC tena */
dcol.d = col; /* delayed IMB col */
cdt.d = col #  /* MAC 96 bit min col */
ack & dack & jam.io #   /* IMB jam */
dcol & ack #   /* hold that col state */
!done & cdt;    /* extend for 96 bit times */
xcol.d = ack & dack & jam.io & !data.io #  /* IMR local TX
col */col #    /* bus wide TX col */
dcol & ack;   /* transitional col */
ldh_cntl.d =  ack & !dack & !dcol # /* load on the start of
a packet */
ack & dack & jam.io & !data.io & !xcol #  /* on first IMR
col */col & !xcol # /* on first bus col */
!loadcntl;  /* all while reset */
jam.d = cdt;  /* jam if collision exist(ed) - using
invclk10mhz */
dtxd.d = txd;   /* delayed tx data */
sdata.d = data.io & ack & dack & !tena & !dtena & !ddtena #
dtxd & dtena;   /* mac tx or rx data */
data.d = sdata #   /* run off invclk10mhz to ensure hold
time */
cdt;    /* or proper jam signal */
rena.d = ack & dack & !jam.io & !cdt & !tena & !dtena &
!ddtena
/* single external data source */# ack & dtena & !cdt; /*
transmit loopback */ s_mreset.d = micro_rst;   /* synced micro reset */
```

— 33 —

Atty. Dkt. No. PD93-00393
Ilyadis & Graham

```
single_req = imr1_req & !imr2_req & !mac_req & !imr3_req &
!imr4_req #
!imr1_req &  imr2_req & !mac_req & !imr3_req & !imr4_req #
!imr1_req & !imr2_req &  mac_req & !imr3_req & !imr4_req #
!imr1_req & !imr2_req & !mac_req &  imr3_req & !imr4_req #
!imr1_req & !imr2_req & !mac_req & !imr3_req &  imr4_req;

any_req = imr1_req # imr2_req # mac_req # imr3_req #
imr4_req;
act_led = ack # col;

/* state equations   */

FIELD rststate = [irst,loadcntl];

$DEFINE rset 'b'00
$DEFINE wait 'b'01
$DEFINE go   'b'11

/* This state machine is responsible for the orderly removal
and insertion
 * of IMRs into active IMBs (lan-hopping). It does this by
reseting and
 * unreseting of the IMRs while the bus is idle. It further
provides for
 * proper LAN operation by allowing at least 64 bit times of
bus idle prior
 * allowing a potentially active IMR onto an unsynchronized
segment.*/

SEQUENCED   rststate {

PRESENT rset

IF bidle & !s_mreset NEXT wait;

IF !bidle # s_mreset NEXT rset;

PRESENT wait

IF !bidle # s_mreset NEXT rset;

IF !done & bidle & !s_mreset NEXT wait;

IF done & bidle & !s_mreset NEXT go;

PRESENT go
```

— 34 —

Atty. Dkt. No. PD93-00393
Ilyadis & Graham

```
    IF bidle & s_mreset NEXT rset;
    IF !s_mreset # !bidle & s_mreset NEXT go;
} data.oe = ack & mac_req & en_outputs;     /* MAC drives bus */
jam.oe = ack & mac_req & en_outputs;
irst.oemux = en_outputs;
cdt.oe = en_outputs;
ldh_cntl.oemux = en_outputs;
loadcntl.oemux = en_outputs;
sdata.oemux = en_outputs;
rena.oemux = en_outputs;
any_req.oemux = en_outputs;
single_req.oemux = en_outputs;
act_led.oemux = en_outputs;

irst.ckmux = clk10mhz;
jam.ckmux = invclk10mhz;
data.ckmux = invclk10mhz;
mac_req.ckmux = clk10mhz;
dack.ckmux = clk10mhz;
dcol.ckmux = clk10mhz;
xcol.ckmux = clk10mhz;
cdt.ckmux = clk10mhz;
ldh_cntl.ckmux = clk10mhz;
loadcntl.ckmux = clk10mhz;
dtena.ckmux = clk10mhz;
ddtena.ckmux = clk10mhz;
dtxd.ckmux = clk10mhz;
sdata.ckmux = clk10mhz;
rena.ckmux = clk10mhz;
s_mreset.ckmux = clk10mhz;

irst.ar = rst;
jam.ar = rst;
data.ar = rst;
mac_req.ar = rst;
dack.ar = rst;
dcol.ar = rst;
xcol.ar = rst;
cdt.ar = rst;
ldh_cntl.ar = rst;
loadcntl.ar = rst;
dtena.ar = rst;
ddtena.ar = rst;
dtxd.ar = rst;
```

—35—
Appendix 1 p. 4

```
sdata.ar = rst;
rena.ar = rst;
s_mreset.ar = rst;

irst.ap = GND;
jam.ap = GND;
data.ap = GND;
mac_req.ap = GND;
dack.ap = GND;
dcol.ap = GND;
xcol.ap = GND;
cdt.ap = GND;
ldh_cntl.ap = GND;
loadcntl.ap = GND;
dtena.ap = GND;
ddtena.ap = GND;
dtxd.ap = GND;
sdata.ap = GND;
rena.ap = GND;
s_mreset.ap = GND;
```

Atty. Dkt. No. PD93-00393
Ilyadis & Graham

Atty. Dkt. No. PD93-00393
Ilyadis & Graham

------ PAL 392 --------

Name Main IMB state machine PAL;
Device p22v10lcc;
Format j;

/ Inputs /
PIN 2    = clk10mhz; / main clk /
PIN 3    = any_req; / any request from IMR/MAC /
PIN 4    = single_req; / One and only one request /
PIN 5    = bidle; / bus is idle /
PIN 6    = my_id; / my id is on the bus /
PIN 7    = gcol_in; / gcol on bus /
PIN 9    = bdata_in; / bdata on bus /
PIN 10   = !rst; / reset /
PIN 13   = en_outputs; / enable outputs /

/* outputs */
PIN 18   = data;     / bi-dir data on IRB /
PIN 17   = en_id;    / drive our id on the bus /
PIN 24   = gcol_out; / gcol out /
PIN 20   = !coll;    / col out /
PIN 21   = bdata_out; / bdata out /
PIN 27   = jam;      / bi-dir jam on IRB /
PIN 26   = !ackl;    / ack on IRB /
PIN [25,23,19] = [x0..2]; / state bits /

/* Intermediate variables improve readability of equations*/

/* local stuff */
lcol = any_req & !single_req;  / local collision /
ltcol = single_req & jam & !data;  / local single IMR TX col /
lrcol = single_req & jam & data;  / local single IMR RX col /

/* global bus stuff */
bsend = !bidle & !gcol_in;  / send occuring on bus /
bsendl = !bidle & !gcol_in & bdata_in;  / send of data = 1/
bcol = !bidle & gcol_in;  / any bus col /
btcol = !bidle & gcol_in & bdata_in;  / bus tx col /
brcol = !bidle & gcol_in & !bdata_in;  / bus rxcol /
bmysend = my_id & !gcol_in;  / my send is on the bus /
bmyltcol = !bidle & my_id & !gcol_in & bdata_in ;
/ my tx col is on the bus /

Atty. Dkt. No. PD93-00393
Ilyadis & Graham

```
bmyrcol = !bidle & my_id & gcol_in & !bdata_in ;
/**  my rx col is on the bus **/

$DEFINE   GND  'b'0
$DEFINE   VCC  'b'1

/* state equations */

FIELD imbstate = [x0..2];

$DEFINE reset    'b'000  /**  reset state - idle **/
$DEFINE sendd    'b'001  /**  we are sending data **/
$DEFINE txcol    'b'010  /**  tx col on bus **/
$DEFINE myxcol   'b'101  /**  I'm only having tx col **/
$DEFINE rxcol    'b'100  /  I'm driving rx col / en_id.d = any_req;   / enable ID when any req /

/ state machine - reference diagram /

SEQUENCED  imbstate {

PRESENT reset
   IF !clk10mhz & (!bidle & any_req # bidle & single_req)
OUT ackl;
   IF !clk10mhz & (bsendl & !any_req # brcol & !any_req) OUT
data;
   IF !clk10mhz & (!bidle & any_req # lcol) OUT coll;
   IF !clk10mhz & (gcol_in & !any_req) OUT jam;
   IF bidle & single_req NEXT sendd;
   IF !bidle & any_req # lcol NEXT txcol OUT gcol_out OUT
bdata_out;
   IF btcol # bcol NEXT txcol;

PRESENT sendd

IF !clk10mhz & (bmysend & single_req) OUT ackl;
   IF !clk10mhz & (btcol # !my_id #'lcol) OUT coll;
   IF bmysend & single_req & !jam & data NEXT sendd OUT
bdata_out;
   IF bmysend & single_req & !jam NEXT sendd;
   IF !my_id # ltcol #'lcol NEXT txcol OUT bdata_out OUT
gcol_out;
   IF btcol NEXT txcol;
   IF bmysend & lrcol NEXT rxcol OUT gcol_out;
   IF bmysend & !any_req NEXT reset;

PRESENT rxcol
```

— 38 —

Atty. Dkt. No. PD93-00393
Ilyadis & Graham

```
    IF !clk10mhz & (bmyrcol & lrcol # bmyrcol & ltcol) OUT
ackl;
    IF !clk10mhz & (!my_id # btcol # lcol) OUT coll;
    IF bmyrcol & lrcol NEXT rxcol OUT gcol_out;
    IF btcol NEXT txcol;
    IF lcol NEXT txcol OUT bdata_out;
    IF !my_id NEXT txcol OUT gcol_out OUT bdata_out;
    IF bmyrcol & ltcol NEXT myxcol OUT bdata_out;
    IF bmyrcol & !any_req NEXT reset;

PRESENT txcol

IF !clk10mhz & (bmyltcol & single_req # !bidle &
!any_req) OUT ackl;
    IF !clk10mhz & (!my_id & any_req # btcol & single_req #
lcol) OUT coll;
    IF !clk10mhz & (!bidle & !any_req) OUT jam;
    IF !clk10mhz & (brcol & !any_req) OUT data;
    IF !my_id & !bidle & !any_req # btcol NEXT txcol;
    IF !my_id & any_req NEXT txcol OUT gcol_out OUT
bdata_out;
    IF btcol & single_req # lcol NEXT txcol OUT bdata_out;
    IF bmyltcol & single_req NEXT myxcol OUT bdata_out;
    IF bmyltcol & !any_req # bidle & !any_req NEXT reset;

PRESENT myxcol

IF !clk10mhz & (bmysend & single_req) OUT ackl;
    IF !clk10mhz & (!my_id # btcol # lcol) OUT coll;
    IF bmyltcol & ltcol # bmyltcol & !jam & single_req NEXT
myxcol OUT bdata_out;
    IF lcol NEXT txcol OUT bdata_out;
    IF !my_id NEXT txcol OUT gcol_out OUT bdata_out;
    IF btcol NEXT txcol;
    IF bmyltcol & lrcol NEXT rxcol OUT gcol_out;
    IF bmyltcol & !any_req NEXT reset;
    }

APPEND ackl = ackl & clk10mhz;
  APPEND coll = coll & clk10mhz;
  APPEND data = data & clk10mhz;
  APPEND jam  = jam  & clk10mhz;

x0.oe = en_outputs;
  x1.oe = en_outputs;
  x2.oe = en_outputs;
  coll.oe = en_outputs;
  ackl.oe = en_outputs;
```

— 39 —

```
bdata_out.oe = en_outputs;
en_id.oe = en_outputs;
gcol_out.oe = en_outputs;
data.oe = ack1 & !any_req & en_outputs;
jam.oe = ack1 & !any_req & en_outputs;

x0.ar = rst;
x1.ar = rst;
x2.ar = rst;
bdata_out.ar = rst;
en_id.ar = rst;
gcol_out.ar = rst;

x0.sp = GND;
x1.sp = GND;
x2.sp = GND;
bdata_out.sp = GND;
en_id.sp = GND;
gcol_out.sp = GND;
```

What is claimed is:

1. A bus system by which a plurality of repeater and station modules in a communications network can transmit data and state information over a backplane at full data rates comprising:

a global synchronizing mechanism, the global synchronization mechanism providing synchronization of data and state information transmitted over the backplane;

a plurality of independent channels for data transmission;

means for connecting the plurality of repeater and station modules to the global synchronizing mechanism and to the plurality of independent channels, the connecting means further comprising:

means for acquiring a first channel by a first repeater module and indicating an acquisition to a plurality of repeater and station modules attached to the first channel;

means for passing data from the first repeater module to the plurality of repeater and station modules attached to the first channel;

means for detecting a bus collision on the first channel; and means for announcing in response to the means for detecting a plurality of conditions between the first repeater module and the plurality of repeater and station modules on the first channel, each of the plurality of conditions indicating collision and state information.

2. The bus system according to claim 1 wherein each of the plurality of channels comprises:

a bus data line;

a global collision line; and a plurality of bus request lines.

3. The bus system according to claim 2 wherein the bus data line, the global collision line, and the plurality of bus request lines are driven by a plurality of modules in a "Wired-OR" circuit.

4. The bus system according to claim 3 wherein the "Wired-OR" circuit comprises drivers which are open collector and open drain with logic asserted true-low.

5. The bus system according to claim 2 wherein the plurality of bus request lines comprises four bus request lines.

6. The bus system according to claim 5 wherein the bus data line, the global collision line, and the four bus request lines are driven by a plurality of modules in a "Wired-OR" circuit.

7. The bus system according to claim 6 wherein the "Wired-OR" circuit comprises drivers which are open collector and open drain with logic asserted true-low.

8. The bus system according to claim 2 wherein the global synchronizing mechanism comprises a set of 10 mhz and 20 mhz global clock lines.

9. The bus system according to claim 2 wherein the global synchronizing mechanism comprises of a global clock line and local Voltage-Controlled Oscillators with Phased-Locked Loops to provide local clocking.

10. The bus system according to claim 2 wherein the means for acquiring the channel comprises:

placing, by the first module, a unique non-idle code on the bus request lines along with data on the data line; and recognizing, by the plurality of modules attached to the first channel, the unique non-idle condition.

11. The bus system according to claim 10 wherein the data on the data line comprises inverted NRZ data at the bit rate of the network.

12. The bus system according to claim 10 wherein the unique idle code comprises all bus request lines deasserted.

13. The bus system according to claim 2 wherein means for detecting a collision on the first channel comprises:

reading back that the "Wired-OR" logical combination of the first module's unique bus request code and the unique codes of the other active modules is not the unique code it is driving.

14. The bus system according to claim 2 wherein the means for the plurality of repeater and station modules to detect the collision comprises:

two or more of the plurality of repeater and station modules becoming active and colliding when attempting to drive the bus simultaneously;

means, by one or more of the repeater and station modules that has become active, for recognizing that it does not read back a bus request code which it is driving on the bus;

means, by the one repeater and station module which recognizes the bus collision, for announcing the collision to the other modules involved in the collision and to inactive modules that are receiving the data by asserting the global collision line and the bus data line simultaneously; and all other repeater and station modules putting themselves in a transmit collision state.

15. The bus system according to claim 2 wherein the means for detecting the bus collision ceasing on the channel comprises:

two or more of the plurality of repeater and station modules becoming active and colliding by attempting to drive the bus simultaneously;

means, by one or more of the modules that has become active, for recognizing that it does not read back a bus request code which it is driving on the bus;

means for detecting, by the active module, the active module's identification code being read back;

means for ceasing, by the active module, the active module's driving of the global collision line, while still driving its unique identification code, in response to the detecting of the its unique identification code; and means for recognizing the deassertion of the global collision line by the remaining repeater and station modules attached to the channel.

16. The bus system according to claim 2 wherein the plurality of modules contain one or more repeaters, each of the repeaters having a plurality of ports.

17. The bus system according to claim 16 wherein the means for announcing a local transmit collision on a module comprises:

a transmit collision occurring between two or more ports on one of the repeater modules;

the repeater experiencing the collision initially asserting on a first bus cycle both the global collision line and the bus data line to indicate the transmit collision has occurred; and the repeater experiencing the collision asserting only the bus data line on subsequent bus cycles.

18. The bus system according to claim 16 wherein the means for announcing a receive collision comprises:

a receive collision occurring on the media attached to the module;

the module involved in the receive collision propagating the receive collision to the rest of the network by way of a JAM signal in which the global collision line is asserted and the bus data line is not asserted.

19. The bus system according to claim 16 wherein the means for announcing a "One-Port-Left" condition comprises:

a single port of a single active module remains active; and propagating, by the module involved in the "One-Port-Left", the condition to the remaining repeaters by way of a JAM signal in which the global collision line is asserted and the bus data line is not asserted.

20. The bus system according to claim 16 wherein the means for announcing a shorter than standard network message length condition across the first channel comprises:

a single port is active on the first module;

the first module which receives the short message and places it on the backplane signals a condition to the plurality of repeaters on the first channel by way of a JAM signal in which the global collision line is asserted and the bus data line is not asserted.

* * * * *